United States Patent
Nonaka et al.

(10) Patent No.: US 9,951,199 B2
(45) Date of Patent: Apr. 24, 2018

(54) ETHYLENE-VINYL ALCOHOL COPOLYMER RESIN COMPOSITION AND METHOD FOR PRODUCING SAME

(75) Inventors: Yasuhiro Nonaka, Kurashiki (JP); Yoshio Yamamoto, Chiyoda-ku (JP); Yoshikazu Yamasaki, Kurashiki (JP)

(73) Assignee: KURARAY CO., LTD., Kurashiki-shi (JP)

(*) Notice: Subject to any disclaimer, the term of this patent is extended or adjusted under 35 U.S.C. 154(b) by 224 days.

(21) Appl. No.: 14/131,301

(22) PCT Filed: Jul. 5, 2012

(86) PCT No.: PCT/JP2012/067226
§ 371 (c)(1),
(2), (4) Date: Jan. 7, 2014

(87) PCT Pub. No.: WO2013/005807
PCT Pub. Date: Jan. 10, 2013

(65) Prior Publication Data
US 2014/0213701 A1 Jul. 31, 2014

(30) Foreign Application Priority Data

Jul. 7, 2011 (JP) ................................ 2011-150981

(51) Int. Cl.
| | | |
|---|---|---|
| C08K 5/134 | (2006.01) | |
| C08K 5/1545 | (2006.01) | |
| C08K 5/13 | (2006.01) | |
| C08K 5/09 | (2006.01) | |
| C08K 5/1535 | (2006.01) | |
| C08F 8/12 | (2006.01) | |

(52) U.S. Cl.
CPC ................. C08K 5/13 (2013.01); C08F 8/12 (2013.01); C08K 5/09 (2013.01); C08K 5/1345 (2013.01); C08K 5/1535 (2013.01); C08K 5/1545 (2013.01)

(58) Field of Classification Search
CPC ...... C08K 5/1345; C08K 5/13; C08K 5/1535; C08K 5/1545; C08L 23/0861
See application file for complete search history.

(56) References Cited

U.S. PATENT DOCUMENTS

| | | |
|---|---|---|
| 2001/0025087 A1 | 9/2001 | Kazeto et al. |
| 2001/0056160 A1 | 12/2001 | Ninomiya et al. |
| 2012/0141642 A1* | 6/2012 | Kubik ................ B32B 7/12 426/133 |

FOREIGN PATENT DOCUMENTS

| | | |
|---|---|---|
| CN | 1289798 A | 4/2001 |
| CN | 1299845 A | 6/2001 |
| EP | 1 125 953 A2 | 8/2001 |
| JP | 9 71620 | 3/1997 |
| JP | 10 67898 | 3/1998 |
| JP | 11 200132 | 7/1999 |
| JP | 2000 178397 | 6/2000 |
| JP | 2001 47571 | 2/2001 |
| JP | 2001 226414 | 8/2001 |
| JP | 2001 234008 | 8/2001 |
| JP | 2002 121290 | 4/2002 |
| JP | 2002 284811 | 10/2002 |
| JP | 4916172 B2 * | 4/2012 ......... B29B 17/0042 |
| WO | 01 96464 | 12/2001 |
| WO | 03 068847 | 8/2003 |
| WO | 2005 014716 | 2/2005 |

OTHER PUBLICATIONS

Machine translation of JP 4916172 B2, 2012.*
Extended European Search Report dated Feb. 3, 2015 in Patent Application No. 12807170.1.
DATABASE WPI, Week 200523, Thomson Scientific, London, GB; AN 2005-222713, XP002734950, 4 pages.
International Search Report dated Oct. 9, 2012 in PCT/JP12/067226 Filed Jul. 5, 2012.

* cited by examiner

*Primary Examiner* — Wenwen Cai
(74) *Attorney, Agent, or Firm* — Oblon, McClelland, Maier & Neustadt, L.L.P.

(57) ABSTRACT

Provided by the present invention is an ethylene-vinyl alcohol copolymer resin composition having superior appearance characteristics (particularly decreased coloring and unevenness of the hue), and is accompanied by suppressed occurrence of yellowing, etc., in melt molding. An ethylene-vinyl alcohol copolymer resin composition containing an ethylene-vinyl alcohol copolymer (A) and a compound having an enediol structure (B), in which a molar ratio of the compound (B) to vinyl alcohol units of the ethylene-vinyl alcohol copolymer (A) is $2.70 \times 10^{-9}$ or greater and $2.70 \times 10^{-5}$ or less.

13 Claims, 1 Drawing Sheet

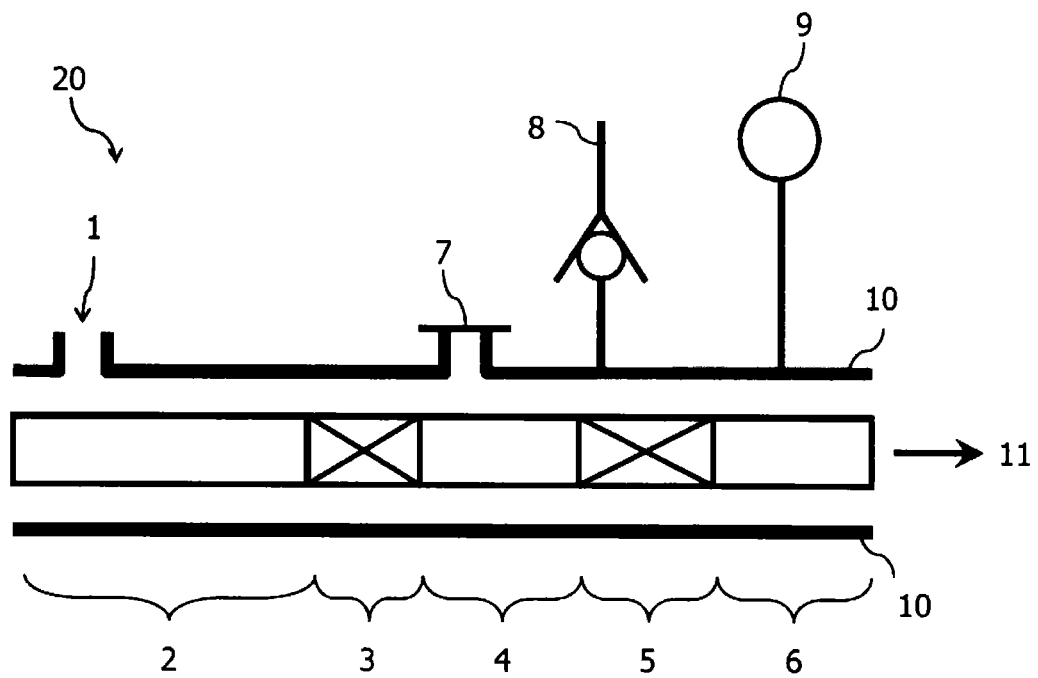

ETHYLENE-VINYL ALCOHOL COPOLYMER RESIN COMPOSITION AND METHOD FOR PRODUCING SAME

CROSS-REFERENCE TO RELATED APPLICATIONS

This application is a National Stage of PCT/JP2012/067226 which was filed on Jul. 5, 2012. This application is based upon and claims the benefit of priority to Japanese Application No. 2011-150981 filed on Jul. 7, 2011.

BACKGROUND OF THE INVENTION

Technical Field

The present invention relates to an ethylene-vinyl alcohol copolymer resin composition and a method for producing the same.

Background Art

Ethylene-vinyl alcohol copolymers (hereinafter, may be also referred to as "EVOH(s)") are superior in oxygen barrier properties, transparency, oil resistance, antistatic properties, mechanical strength and the like, and have been broadly used as various types of packaging materials such as films, sheets and containers, etc.

In general, superior appearance characteristics of e.g., the absence of coloring such as yellowing, and the absence of unevenness of hues are required for EVOH resin compositions containing EVOH. In addition, since the films and the like are usually formed by a melt molding method, EVOH resin compositions are expected to have superior appearance characteristics (absence of generation of gels and seeds (i.e., dirt under paint), absence of occurrence of coloring such as yellowing, and the like) without any quality unevenness even in melt molding, long-run workability (a property enabling a molded article to be obtained without change of physical properties such as viscosity, etc., and without occurrence of fish-eye, streak, etc., if molded for a long period of time), and the like. In addition, films, sheets and the like are often formed with a multilayer structure having an EVOH resin composition layer for the purpose of improving oxygen barrier properties and the like. When such a multilayer structure is to be obtained, a metal salt is often contained in an EVOH resin composition in order to improve adhesiveness between layers. However, it is known that when a metal salt is included in an EVOH resin composition, coloring such as yellowing is more likely to be caused, and thus appearance characteristics are deteriorated. Particularly, in use such as sheet molding, mold flash of the sheet after obtaining the molded article has been recovered and recycled; however, repeated recycling results in enhanced deterioration of the EVOH resin composition, thereby leading to disadvantages such as deteriorated appearance of the molded article due to an increase of defects such as gels and seeds.

Under such circumstances, in order to improve appearance characteristics of the EVOH resin composition, various proposals have been made such as a saponification product of a vinyl acetate-derived polymer obtained by polymerizing one or more types of monomer that includes vinyl acetate, followed by adding thereto a conjugated polyene compound having a boiling point of 20° C. or greater, and saponifying the vinyl acetate-derived polymer (Patent Document 1), an ethylene-vinyl ester copolymer saponification product composition containing 100 to 5,000 ppm of a hydroxycarboxylic acid and/or a salt thereof in terms of hydroxycarboxylic acid equivalent, 50 to 500 ppm of an alkali metal in terms of metal equivalent, and 20 to 200 ppm of an alkaline earth metal in terms of metal equivalent (Patent Document 2), and a resin composition for use in modifying a hydroxyl group-containing thermoplastic resin characterized by containing an ethylene-vinyl acetate copolymer saponification product, and 0.001 to 10% by weight of at least one type selected from a boric acid compound, phosphoric acid or a compound thereof and a fatty acid salt (Patent Document 3). However, these EVOH resin compositions can be still further improved with regard to appearance characteristics such as hues.

In addition, as an organic compound-based oxygen absorbent, or for the purpose of inhibiting degradation of EVOH in a film-forming solution containing a tertiary amine, blending a multivalent phenol into an EVOH resin composition has been known (Patent Document 4 and Patent Document 5). However, these EVOH resin compositions are disadvantageous in that when 0.1% by mass or more of the multivalent phenol is blended into EVOH in order to achieve the intended oxygen-absorbing effect or degradation inhibitory effect, the hue of the EVOH resin composition is deteriorated.

PRIOR ART DOCUMENTS

Patent Documents

Patent Document 1: Japanese Unexamined Patent Application, Publication No. H9-71620
Patent Document 2: Japanese Unexamined Patent Application, Publication No. H10-67898
Patent Document 3: Japanese Unexamined Patent Application, Publication No. 2000-178397
Patent Document 4: Japanese Unexamined Patent Application, Publication No. 2001-047571
Patent Document 5: Japanese Unexamined Patent Application, Publication No. H11-200132

SUMMARY OF THE INVENTION

Problems to be Solved by the Invention

As set forth in the foregoing, various measures have been taken in order to improve the appearance characteristics of an EVOH resin composition. However, also according to these EVOH resin compositions, the appearance characteristics (particularly, decreased coloring and unevenness of the hue) cannot be satisfactorily improved. Particularly, in a step of producing the EVOH resin composition, a problem that the residence time varies in a dryer is raised, whereby unevenness of the hue is caused. Moreover, yellowing and the like occurs during melt molding, and thus deterioration of the appearance characteristics (particularly, unevenness of the hue) may be caused on the molded product.

The present invention was made in order to solve the foregoing problems, and an object of the invention is to provide an EVOH resin composition having superior appearance characteristics, and being accompanied by suppressed occurrence of yellowing, etc., in melt molding.

Means for Solving the Problems

The problems are solved by providing an ethylene-vinyl alcohol copolymer resin composition containing an ethylene-vinyl alcohol copolymer (A), and a compound having an enediol structure (B) (hereinafter, may be also merely referred to as "compound (B)"), in which a molar ratio of the compound (B) to vinyl alcohol units of the ethylene-vinyl alcohol copolymer (A) is $2.70 \times 10^{-9}$ or greater and $2.70 \times 10^{-5}$ or less.

It is also preferred that the compound (B) has a carboxyl group, a lactone ring or a combination thereof. Moreover, the compound (B) is preferably a phenol or an ascorbic acid, and the compound (B) is more preferably at least one selected from the group consisting of gallic acid, methyl gallate, ethyl gallate, propyl gallate, isoamyl gallate, octyl gallate, tannic acid, pyrogallol, catechol, catechin, epicatechin, epigallocatechin, epigallocatechin gallate, ellagic acid, ascorbic acid and erythorbic acid. Also, it is preferred that the compound (B) has a molecular weight of 2,000 or less.

In addition, it is also preferred that the EVOH resin composition further contains a carboxylic acid compound and/or carboxylic acid ion other than the compound (B), in which a percentage content of the carboxylic acid compound and/or the carboxylic acid ion is 0.01 μmol/g or greater and 20 μmol/g or less in terms of carboxylic acid radical equivalent.

It is also preferred that the EVOH resin composition has a ratio $\epsilon_2/\epsilon_1$, i.e., a ratio of an extinction coefficient $\epsilon_2$ at 225 nm after a heat treatment in the air at 120° C. for 24 hrs to an extinction coefficient $\epsilon_1$ at 225 nm before the heat treatment of 2.0 or less.

Furthermore, the problems can be also solved by a method for producing the EVOH resin composition including a saponification step of saponifying an ethylene-vinyl ester copolymer to obtain the ethylene-vinyl alcohol copolymer (A), and a mixing step of mixing the compound (B) with the ethylene-vinyl alcohol copolymer (A) after the saponification step.

The production method preferably includes: a pelletization step for obtaining hydrous pellets containing the ethylene-vinyl alcohol copolymer (A) by a granulating operation carried out using the ethylene-vinyl alcohol copolymer (A) obtained in the saponification step; a drying step of drying the hydrous pellets; and the mixing step after the pelletization step and before the drying step, in which the mixing step includes immersing the hydrous pellets in a solution containing the compound (B). Moreover, a method for producing the EVOH resin composition including: a pelletization step of carrying out a granulating operation using the ethylene-vinyl alcohol copolymer (A) obtained in the saponification step and the compound (B) to obtain hydrous pellets containing the ethylene-vinyl alcohol copolymer (A) and the compound (B); and a drying step of drying the hydrous pellets is also preferred.

The foregoing problems can be also solved by a molded product formed by molding the EVOH resin composition. In addition, the problems can be also solved by a multilayer structure having a layer formed from the EVOH resin composition.

Effects of the Invention

According to an aspect of the present invention, an EVOH resin composition having superior appearance characteristics (particularly, accompanied by less coloring and unevenness of the hue), and being accompanied by suppressed occurrence of yellowing, etc., in melt molding can be provided. In addition, when an EVOH resin composition is produced according to a production method of a further aspect of the present invention, the effects described above can be certainly achieved. According to the EVOH resin composition of another aspect of the present invention, various types of molded articles such as monolayer or multilayer films, sheets, pipes, containers and fibers having superior appearance characteristics can be obtained.

BRIEF DESCRIPTION OF THE DRAWINGS

FIG. 1 shows a schematic view illustrating a twin-screw extruder used in Example 54.

DESCRIPTION OF EMBODIMENTS

Hereinafter, embodiments of the present invention will be explained in detail in the order of: each component, the EVOH resin composition, the method for producing an EVOH resin composition, and the molded product and the multilayer structure constituted with the EVOH resin composition.

Ethylene-Vinyl Alcohol Copolymer (A)

EVOH (A) is a principal component of the EVOH resin composition of the embodiment of the present invention. EVOH (A) is a copolymer having as a main structural unit, an ethylene unit and a vinyl alcohol unit. It is to be noted that EVOH (A) may have in addition to an ethylene unit and a vinyl alcohol unit, one or more types of other structural unit. EVOH (A) is usually obtained by polymerizing ethylene and a vinyl ester, followed by subjecting the resulting ethylene-vinyl ester copolymer to saponification.

The lower limit of the ethylene content of EVOH (A) (i.e., a proportion of the number of ethylene units with respect to the total number of the monomer units in EVOH (A)) is preferably 20 mol %, more preferably 22 mol %, and still more preferably 24 mol %. On the other hand, the upper limit of the ethylene content of EVOH (A) is preferably 60 mol %, more preferably 55 mol %, and still more preferably 50 mol %. When the ethylene content of EVOH (A) falls within the above range, sufficient appearance characteristics and long-run workability can be exhibited. When the ethylene content of EVOH (A) is less than the lower limit, water resistance, hot water resistance and gas barrier properties under highly humid conditions may be deteriorated when a multilayer structure is molded, and melt formability may be deteriorated. To the contrary, when the ethylene content of EVOH (A) is greater than the upper limit, gas barrier properties may be deteriorated when a multilayer structure is molded.

The lower limit of the degree of saponification of EVOH (A) (i.e., a proportion of the number of vinyl alcohol units with respect to the total number of the vinyl alcohol units and the vinyl ester units in EVOH (A)) is preferably 80 mol %, more preferably 95 mol %, and still more preferably 99 mol %. On the other hand, the upper limit of the degree of saponification of EVOH (A) is preferably 100 mol %, and more preferably 99.99 mol %. When the degree of saponification of EVOH (A) falls within the above range, a molded product and a multilayer structure that are superior in gas barrier properties can be obtained.

The lower limit of the melt flow rate of EVOH (A) (in accordance with JIS-K7210, a measurement at a temperature of 210° C. under a load of 2,160 g) is preferably 0.1 g/10 min, more preferably 0.5 g/10 min, still more preferably 1 g/10 min, and particularly preferably 3 g/10 min. On the other hand, the upper limit of the melt flow rate of EVOH (A) is preferably 200 g/10 min, more preferably 50 g/10 min, still more preferably 30 g/10 min, and particularly preferably 15 g/10 min. When the melt flow rate of EVOH (A) is a value falling within the above range, melt formability of the resultant EVOH resin composition is improved, and more superior appearance characteristics and long-run workability can be exhibited.

Compound Having an Enediol Structure (B)

The compound having an enediol structure (B) contained in the EVOH resin composition of the embodiment of the present invention is a compound having a double bond within the molecule, and further having a hydroxy group at both two ends of the double bond. It is to be noted that the double bond as referred to herein may form a part of an aromatic ring such as a benzene ring. It is preferred that the double bond forms a part of a benzene ring, and further a hydroxy group is included at meta-position, since coloring such as yellowing can be further suppressed. In addition, the hydroxy group may form a salt.

The compound (B) is not particularly limited as long as an enediol structure is included, and a carboxyl group, a lactone ring or a combination thereof is preferably included. When the compound (B) has a carboxyl group, a lactone ring or a combination thereof, coloring such as yellowing can be further suppressed. The carboxyl group may have an ester structure, or form a salt with a metal.

The compound (B) is preferably a phenol or an ascorbic acid. When the compound (B) is a phenol or an ascorbic acid, coloring such as yellowing can be further suppressed. As referred to herein, "a phenol" means a compound having a hydroxyl group on an aromatic ring, and examples thereof include catechins such as catechin, epicatechin, epigallocatechin and epigallocatechin gallate, gallic acid, methyl gallate, ethyl gallate, propyl gallate, isoamyl gallate, octyl gallate, tannic acid, pyrogallol, catechol, ellagic acid, and the like. Furthermore, "an ascorbic acid" as referred to means ascorbic acid, an isomer thereof, and a derivative and a salt thereof, which may include, for example, ascorbic acid, erythorbic acid, and the like.

The upper limit of the molecular weight of the compound (B) is preferably 2,000, more preferably 1,500, still more preferably 1,000, and particularly preferably 500. The lower limit of the molecular weight of the compound (B) is preferably 100, more preferably 120, and still more preferably 150. When the molecular weight of the compound (B) falls within the above range, unevenness of the hue resulting from drying can be further inhibited.

The upper limit value of the molar ratio of the compound (B) to the vinyl alcohol units of the ethylene-vinyl alcohol copolymer (A) is $2.70 \times 10^{-5}$, preferably $2.02 \times 10^{-5}$, and more preferably $1.35 \times 10^{-5}$. On the other hand, the lower limit value of the molar ratio is $2.70 \times 10^{-9}$, preferably $8.09 \times 10^{-9}$, and more preferably $1.35 \times 10^{-8}$. When the molar ratio of the compound (B) to the vinyl alcohol units of the ethylene-vinyl alcohol copolymer (A) falls within the above range, coloring such as yellowing in drying or melt molding can be further inhibited.

Although not particularly limited, the content of the compound (B) with respect to the total amount of the EVOH resin composition is preferably 0.01 to 100 ppm. The lower limit value of the content of the compound (B) is more preferably 0.03 ppm, and still more preferably 0.05 ppm. On the other hand, the upper limit value of the content of the compound (B) is more preferably 80 ppm, still more preferably 50 ppm, and particularly preferably 10 ppm. When the content of the compound (B) falls within the above range, coloring such as yellowing in drying or melt molding can be further inhibited.

Carboxylic Acid and/or Carboxylic Acid Ion

When a carboxylic acid and/or a carboxylic acid ion is contained in the EVOH resin composition of the embodiment of present invention, coloring resistance in melt molding of the EVOH resin composition can be improved. It is to be noted that the carboxylic acid and/or the carboxylic acid ion as referred to herein does not include the compound (B).

The carboxylic acid is a compound having one or more carboxyl groups within its molecule. Further, the carboxylic acid ion is derived from the carboxylic acid by eliminating a hydrogen ion of its carboxyl group. The carboxylic acid which may be contained in the EVOH resin composition of the embodiment of present invention may be a monocarboxylic acid, a multivalent carboxylic acid compound having two or more carboxyl groups within its molecule, or a combination of these. It is to be noted that the multivalent carboxylic acid does not include any polymer. Further, the multivalent carboxylic acid ion is derived from the multivalent carboxylic acid by eliminating at least one hydrogen ion of its carboxyl group. The carboxyl group of the carboxylic acid may have an ester structure, or the carboxylic acid ion may form a salt with a metal.

The monocarboxylic acid is not particularly limited, and examples thereof include formic acid, acetic acid, propionic acid, butyric acid, caproic acid, capric acid, acrylic acid, methacrylic acid, benzoic acid, 2-naphthoic acid, and the like. These carboxylic acids may have a hydroxyl group and/or a halogen atom. In addition, the carboxylic acid ion is exemplified by those derived from each carboxylic acid by eliminating a hydrogen ion of its carboxyl group. The pKa of the monocarboxylic acid (also including the monocarboxylic acid that gives the monocarboxylic acid ion) is, in light of adjustability of the pH of the composition and melt formability, preferably 3.5 or greater, and more preferably 4 or greater. Examples of such a monocarboxylic acid include formic acid (pKa=3.68), acetic acid (pKa=4.74), propionic acid (pKa=4.85), butyric acid (pKa=4.80), and the like. In light of easy handling and the like, acetic acid is preferred.

Moreover, the multivalent carboxylic acid is not particularly limited as long as two or more carboxyl groups are included within its molecule, and examples thereof include: aliphatic dicarboxylic acids such as oxalic acid, malonic acid, succinic acid, maleic acid, fumaric acid, glutaric acid, adipic acid and pimelic acid; aromatic dicarboxylic acids such as phthalic acid, isophthalic acid and terephthalic acid; tricarboxylic acids such as aconitic acid; carboxylic acid having 4 or more carboxyl groups such as 1,2,3,4-butanetetracarboxylic acid and ethylenediaminetetraacetic acid; hydroxycarboxylic acids such as tartaric acid, citric acid, isocitric acid, malic acid, mucic acid, tartronic acid and citramalic acid; ketocarboxylic acids such as oxaloacetic acid, mesoxalic acid, 2-ketoglutaric acid and 3-ketoglutaric acid; amino acids such as glutamic acid, aspartic acid and 2-aminoadipic acid; and the like. Examples of the multivalent carboxylic acid ion include anions of these multivalent carboxylic acids. Of these, succinic acid, malic acid, tartaric acid and citric acid are particularly preferred in light of favorable availability.

With regard to the content of the carboxylic acid and carboxylic acid ion, in light of the coloring resistance in melt molding, the upper limit with respect to the ethylene-vinyl alcohol copolymer resin composition in terms of carboxylic acid radical equivalent is preferably 20 μmol/g, more preferably 15 μmol/g, and still more preferably 10 μmol/g. The lower limit of the content in terms of carboxylic acid radical equivalent is preferably 0.01 μmol/g, more preferably 0.05 μmol/g, and still more preferably 0.5 μmol/g.

The content of the carboxylic acid can be quantitatively determined distinctly by a quantitative determination method as described later in Examples even in the case in which the compound (B) includes a carboxyl group.

Metal Ion

The EVOH resin composition of the embodiment of the present invention may further contain a metal ion. The metal ion may either of a single metal species, or of a plurality of metal species. When the metal ion is contained in the EVOH resin composition of the embodiment of the present invention, interlayer adhesiveness can be improved when molded to give a multilayer structure, and as a result, durability of the multilayer structure can be improved. Although the reason for the improvement of the interlayer adhesiveness by such a metal ion is not necessarily clear, in the case in which one of adjacent layers has a functional group that can react with a hydroxy group of EVOH (A) within its molecule, and the like, the bond-forming reaction is presumed to be accelerated due to the presence of the metal ion. Examples of the metal ion include alkali metal ions, alkaline earth metal ions, other transition metal ions, and the like.

The lower limit of the content of the metal ion (content in a dry EVOH resin composition) is preferably 2.5 µmol/g, more preferably 3.5 µmol/g, and still more preferably 4.5 µmol/g. On the other hand, the upper limit of the content of the metal ion is preferably 22 µmol/g, more preferably 16 µmol/g, and still more preferably 10 mol/g. When the content of the metal ion is less than the lower limit, the interlayer adhesiveness may be lowered. To the contrary, when the content of the metal ion is greater than the upper limit, suppression of coloring of the EVOH resin composition by including the compound (B) can be difficult, whereby the appearance characteristics may be deteriorated.

The metal ion preferably contains an alkali metal ion. Examples of the alkali metal ion include ion ions of lithium, sodium, potassium, rubidium, cesium and the like, and in light of industrial availability, an ion of sodium or potassium is more preferred. When the EVOH resin composition of the embodiment of the present invention contains the alkali metal ion, long-run workability, and interlayer adhesive force when a multilayer structure is provided can be improved.

Although the alkali metal salt that gives the alkali metal ion is not particularly limited, examples thereof include aliphatic carboxylic acid salts, aromatic carboxylic acid salts, phosphoric acid salts, metal complexes and the like of lithium, sodium potassium or the like. Specific examples of the alkali metal salt include sodium acetate, potassium acetate, sodium dihydrogen phosphate, disodium hydrogen phosphate, trisodium phosphate, potassium dihydrogen phosphate, dipotassium hydrogen phosphate, tripotassium phosphate, lithium dihydrogen phosphate, trilithium phosphate, sodium stearate, potassium stearate, sodium salts of ethylenediaminetetraacetic acid, and the like. Of these, sodium acetate, potassium acetate and sodium dihydrogen phosphate are particularly preferred in light of favorable availability.

The lower limit of the content of the alkali metal ion (content in a dry EVOH resin composition) is preferably 2.5 µmol/g, more preferably 3.5 µmol/g, and still more preferably 4.5 µmol/g. On the other hand, the upper limit of the content of the alkali metal ion is preferably 22 µmol/g, more preferably 16 µmol/g, and still more preferably 10 µmol/g. When the content of the alkali metal ion is less than the lower limit, the interlayer adhesive force may be decreased when molded to give a multilayer structure. To the contrary, when the content of the alkali metal ion is greater than the upper limit, suppression of coloring of the EVOH resin composition due to including the compound (B) can be difficult, whereby the appearance characteristics may be deteriorated.

It is also preferred that the metal ion includes an alkaline earth metal ion. Examples of the alkaline earth metal ion include ions of beryllium, magnesium, calcium, strontium, barium and the like, and in light of industrial availability, an ion of magnesium or calcium is more preferred. When the metal ion includes the alkaline earth metal ion, deterioration of the EVOH resin composition when the multilayer structure is repeatedly recycled can be suppressed, and the appearance of the molded article owing to a decrease of defects such as gels and seeds.

Phosphoric Acid Compound

The EVOH resin composition of the embodiment of the present invention may further contain a phosphoric acid compound. When the phosphoric acid compound is contained in the EVOH resin composition of the embodiment of the present invention, long-run workability of the EVOH resin composition in melt molding can be improved.

The phosphoric acid compound is not particularly limited, and is exemplified by various types of oxyacid of phosphorus such as phosphoric acid, phosphorous acid and salts thereof, and the like. Phosphoric acid salts may be included in any form of, for example, a monobasic phosphoric acid salt, a dibasic phosphoric acid salt and a tribasic phosphoric acid salt, and a counter cation species thereof is not particularly limited; however, an alkali metal salt or an alkaline earth metal salt is preferred, and an alkali metal salt is more preferred. Specifically, sodium dihydrogen phosphate, potassium dihydrogen phosphate, disodium hydrogen phosphate or dipotassium hydrogen phosphate is preferred in light of improvement of long-run workability in melt molding.

The lower limit of the content of the phosphoric acid compound (content in terms of phosphate radical in a dry EVOH resin composition) is preferably 1 ppm, more preferably 5 ppm, and still more preferably 8 ppm. On the other hand, the upper limit of the content of the phosphoric acid compound is preferably 500 ppm, more preferably 200 ppm, and still more preferably 50 ppm. When the content of the phosphoric acid compound is less than the lower limit, the effect of improving the long-run workability in melt molding may not be sufficiently exhibited. To the contrary, when the content of the phosphoric acid compound is greater than the upper limit, gels and seeds of the molded article may be likely to be generated.

Boron Compound

When a boron compound is contained in the EVOH resin composition of the embodiment of the present invention, long-run workability in melt molding of the EVOH resin composition can be improved, and as a result, generation of gels, seeds and the like can be suppressed, thereby enabling the appearance characteristics to be improved. More particularly, when the boron compound is blended in the EVOH resin composition, it is presumed that a boric acid ester is produced between EVOH (A) and the boron compound, and the long-run workability can be more improved by using such an EVOH resin composition as compared with a resin composition not containing a boron compound.

The boron compound is not particularly limited, and examples thereof include boric acids, boric acid esters, boric acid salts, boron hydrides, and the like. Specifically, examples of the boric acids include orthoboric acid ($H_3BO_3$), metaboric acid, tetraboric acid, and the like; examples of the boric acid ester include triethyl borate, trimethyl borate and the like; and examples of the boric acid salts include alkali metal salts and alkaline earth metal salts of various types of the boric acids described above, as well as borax, and the like. Of these, orthoboric acid is preferred.

The lower limit of the content of the boron compound (content in terms of boron element of the boron compound in a dry EVOH resin composition) is preferably 5 ppm, more preferably 10 ppm, and still more preferably 50 ppm. On the other hand, the upper limit of the content of the boron compound is preferably 2,000 ppm, more preferably 1,000 ppm, still more preferably 500 ppm, and particularly preferably 300 ppm. When the content of the boron compound is less than the lower limit, the effect of improving the long-run workability in melt molding by adding the boron compound may not be achieved. To the contrary, when the content of the boron compound is greater than the upper limit, the effect of improving the long-run workability in melt molding may be impaired.

Other Additive, Etc.

To the EVOH resin composition of the embodiment of the present invention may be added a plasticizer, a stabilizer, a surfactant, a coloring material, an ultraviolet ray absorbing agent, a slipping agent, an antistatic agent, a drying agent, a crosslinking agent, a filler, a reinforcing agent such as various types of fibers, and the like in an appropriate amount, within a range not leading to impairment of the effects of the embodiment of the present invention.

In addition, a thermoplastic resin other than EVOH (A) may be also blended in an appropriate amount, within a range not leading to impairment of the effects of the embodiment of the present invention. Examples of the thermoplastic resin other than EVOH (A) which may be used include various types of polyolefins (including polyethylene, polypropylene, poly 1-butene, poly 4-methyl-1-pentene, ethylene-propylene copolymers, copolymers of ethylene with an α-olefin having 4 or more carbon atoms, polyolefins modified with maleic anhydride, ethylene-vinyl ester copolymers, ethylene-acrylic acid ester copolymers, and modified polyolefins obtained by graft modification of these with an unsaturated carboxylic acid or a derivative thereof, and the like), various types of nylons (including nylon-6, nylon-66, nylon-6/66 copolymers, and the like), polyvinyl chloride, polyvinylidene chloride, polyesters, polystyrene, polyacrylonitrile, polyurethane, polyacetal, modified polyvinyl alcohol resin, and the like. When the thermoplastic resin other than EVOH (A) is contained, the amount blended with respect to the EVOH resin composition is preferably 50% by mass or less, and more preferably 10% by mass or less.

EVOH Resin Composition

According to the EVOH resin composition of the embodiment of the present invention, a ratio $\epsilon2/\epsilon1$ of an extinction coefficient $\epsilon2$ at 225 nm after a heat treatment in the air at 120° C. for 24 hrs to the extinction coefficient $\epsilon1$ at 225 nm before the heat treatment is preferably 2.0 or less, more preferably 1.8 or less, and still more preferably 1.6 or less. When the ratio of the extinction coefficient falls within the above range, an EVOH resin composition being accompanied by less unevenness of the hue, and superior in appearance characteristics can be obtained.

Herein, the extinction coefficient $\epsilon$ is a value represented by the following formula (1):

$$\epsilon=A/(L \times C) \tag{1}$$

in the formula, A represents the absorbance of light at 225 nm measured using an absorption photometer; L represents a light path length (unit: cm); and C represents a concentration (% by mass) of the ethylene-vinyl alcohol copolymer resin composition.

The extinction coefficient is measured after dissolving the EVOH resin composition in a solvent. The solvent used for the measurement may be a solution that can dissolve the ethylene-vinyl alcohol copolymer composition before and after the heat treatment, and a mixing ratio of 1-propanol to water should be appropriately adjusted for the measurement.

The lower limit of the melt flow rate of the EVOH resin composition of the embodiment of the present invention (measurement at a temperature of 210° C. and a load of 2,160 g) is preferably 0.1 g/10 min, more preferably 0.5 g/10 min, still more preferably 1 g/10 min, and particularly preferably 3 g/10 min. On the other hand, the upper limit of the melt flow rate of the EVOH resin composition is preferably 200 g/10 min, more preferably 50 g/10 min, still more preferably 30 g/10 min, and particularly preferably 15 g/10 min. When the melt flow rate of the EVOH resin composition falls within the above range, melt formability is improved and thus superior appearance characteristics and long-run workability can be exhibited.

In addition, the lower limit of the pH measured at 20° C. of an extraction liquid obtained by subjecting 10 g of the EVOH resin composition to extraction in 50 ml of pure water at 95° C. for 4 hrs is preferably 3.5, more preferably 3.8, and still more preferably 4.0. On the other hand, the upper limit of the pH of the extraction liquid is preferably 8.0, more preferably 7.8, and still more preferably 7.5. When the pH of the extraction liquid falls within the above range, occurrence of yellowing, etc., in melt molding can be further suppressed.

Method for Producing an EVOH Resin Composition

The EVOH resin composition of the embodiment of the present invention can be effectively obtained by production method which includes, for example, a copolymerization step of copolymerizing ethylene with a vinyl ester to obtain an ethylene-vinyl ester copolymer (step 1); and a saponification step of saponifying the ethylene-vinyl ester copolymer to obtain an ethylene-vinyl alcohol copolymer (A) (step 2), and which further includes after the saponification step a mixing step of mixing the ethylene-vinyl alcohol copolymer (A) with the compound having an enediol structure (B).

According to the production method, due to mixing the compound (B) after the saponification step described later, occurrence of yellowing, etc., in drying or melt molding can be inhibited, and the EVOH resin composition and molded product free from quality unevenness can be obtained. Each step will be described in detail below.

Step 1

The copolymerization step is a step of copolymerizing ethylene with a vinyl ester to obtain an ethylene-vinyl ester copolymer. Furthermore, as needed, a step of obtaining an ethylene-vinyl ester copolymer solution follows thereafter, this step including eliminating unreacted ethylene and an unreacted vinyl ester. When the compound (B) is added in the copolymerization step, a finally obtained EVOH resin composition may almost fail to achieve a main object of the present invention, i.e., the effect of suppressing coloring such as yellowing, or coloring may rather be enhanced.

Although a copolymerization process of ethylene with the vinyl ester is not particularly limited, a well-known process such as e.g., any of solution polymerization, suspension polymerization, emulsion polymerization, bulk polymerization and the like may be employed. Further, the copolymerization process may be carried out in either a continuous system or a batchwise system.

Examples of the vinyl ester used in the polymerization include vinyl formate, vinyl acetate, vinyl propionate, vinyl valerate, vinyl caprate, vinyl laurate, vinyl stearate, vinyl benzoate, vinyl pivalate, vinyl versatate and the like. In light of industrial availability/use, vinyl acetate may be suitably used.

In the polymerization described above, in addition to the aforementioned components, a copolymerizable monomer may be also copolymerized in a small amount as a copolymerization component such as, for example, an unsaturated acid such as acrylic acid, methacrylic acid, crotonic acid, maleic acid or itaconic acid, or an anhydride, a salt, a mono- or dialkyl ester thereof, or the like; a nitrile such as acrylonitrile or methacrylonitrile; an amide such as acrylamide or methacrylamide; an olefin sulfonic acid such as vinylsulfonic acid, allylsulfonic acid or methallylsulfonic acid, or a salt thereof; an alkyl vinyl ether, vinyl ketone, N-vinylpyrrolidone, vinyl chloride, vinylidene chloride or the like.

Additionally, a vinylsilane compound may be included in an amount of 0.0002% by mole or greater and 0.2% by mole or less as a copolymerization component. Herein, the vinylsilane compound may include, for example, vinyltrimethoxysilane, vinyltriethoxysilane, vinyltri(β-methoxy-ethoxy)silane, γ-methacryloyloxypropylmethoxysilane or the like. Of these, vinyltrimethoxysilane or vinyltriethoxysilane is suitably used.

A solvent which may be used in the polymerization is not particularly limited as long as it is an organic solvent which can dissolve ethylene, a vinyl ester and the ethylene-vinyl ester copolymer. As such a solvent, for example, an alcohol such as methanol, ethanol, propanol, n-butanol or tert-butanol; dimethyl sulfoxide or the like may be used. Of these, methanol is particularly preferred in light of ease in removal and separation after the reaction.

As an initiator for use in the polymerization, for example, an azonitrile based initiator such as 2,2'-azobisisobutyronitrile, 2,2'-azobis-(2,4-dimethylvaleronitrile), 2,2'-azobis-(4-methoxy-2,4-dimethylvaleronitrile) or 2,2'-azobis-(2-cyclopropylpropionitrile); an organic peroxide based initiator such as isobutyryl peroxide, cumyl peroxyneodecanoate, diisopropyl peroxydicarbonate, di-n-propyl peroxydicarbonate, t-butyl peroxyneodecanoate, acetyl peroxide, lauroyl peroxide, benzoyl peroxide, t-butyl hydroperoxide, or the like may be used.

The polymerization temperature is preferably 20 to 90° C., and more preferably 40 to 70° C. Polymerization time is preferably 2 to 15 hrs, and more preferably 3 to 11 hrs. The rate of polymerization is preferably 10 to 90%, and more preferably 30 to 80% relative to the vinyl ester charged. The resin content in the solution after the polymerization is preferably 5 to 85% by mass, and more preferably 20 to 70% by mass.

After carrying out the polymerization for a predetermined time period, or after attaining a predetermined rate of polymerization, a polymerization inhibitor is added if necessary, and an unreacted ethylene gas is removed by evaporation, followed by removing an unreacted vinyl ester. As a process of removing the unreacted vinyl ester, for example, a process including: continuously supplying the copolymer solution at a constant rate through an upper part of a tower filled with Raschig rings; blowing therein an organic solvent vapor such as methanol through a lower part of the tower; distilling off mixed vapor of the organic solvent such as methanol and the unreacted vinyl ester through the top of the tower; and taking out the copolymer solution from which the unreacted vinyl ester was removed through the bottom of the tower, or the like may be employed.

Step 2

Next, an alkali catalyst is added to the copolymer solution, and the copolymer is saponified. The saponification process can be carried out in either a continuous system or a batchwise system. As the alkali catalyst, for example, sodium hydroxide, potassium hydroxide, alkali metal alcoholate or the like may be used.

Conditions of the saponification may involve, for example, in the case of the batchwise system: the concentration of the copolymer solution being 10 to 50% by mass; the reaction temperature being 30 to 60° C.; the amount of the catalyst used being 0.02 to 0.6 mol per mol of the vinyl ester structural unit; and the saponification time being 1 to 6 hrs. In the case of the continuous system, a method including carrying out the saponification reaction while efficiently removing a carboxylic acid methyl ester produced during the saponification reaction using a conventionally known tower type reactor is preferred since the amount of the alkali catalyst used can be reduced, whereas the reaction temperature is preferably 70 to 150° C. and the amount of the catalyst used is preferably 0.001 to 0.2 mol per mole of the vinyl ester structural unit for allowing the reaction to be carried out in a state of a uniform solution.

Since EVOH (A) yielded after the completion of the saponification reaction contains the alkali catalyst, by-product salts such as sodium acetate and potassium acetate, and other impurities, these are preferably removed by neutralizing and washing as needed. When EVOH (A) after completing the saponification reaction is washed with water that scarcely contains a metal ion, a chloride ion and the like such as ion exchanged water, sodium acetate, potassium acetate and the like may partly remain.

In the method for producing an EVOH resin composition of the embodiment of the present invention, after carrying out the saponification reaction in the aforementioned saponification step, neutralization of the remaining alkali catalyst is often adopted. In this instance, it is also possible to conduct the mixing with the compound (B) together with an acid used for the neutralization.

In the method for producing an EVOH resin composition of the embodiment of the present invention, it is preferred that the method further includes:

a pelletization step of obtaining hydrous pellets of the ethylene-vinyl alcohol copolymer (A) from the solution containing the ethylene-vinyl alcohol copolymer (A) obtained in the saponification step by a granulating operation (step 3), and a drying step of drying the hydrous pellets to obtain the ethylene-vinyl alcohol copolymer resin composition (step 4), in addition to each step described above, and that the mixing step is carried out after the pelletization step. Also according to the method, the EVOH resin composition accompanied by less yellowing can be effectively obtained.

Step 3

In the production of EVOH (A), the ethylene-vinyl alcohol copolymer (A) obtained in the saponification step is typically has a form of a solution containing a solvent used for the saponification reaction. Since the solution contains a catalyst such as an alkali used in the saponification reaction, sodium acetate produced as a byproduct, and the like, washing is carried out for eliminating these. In order to facilitate the washing operation, it is preferred that an ethylene-vinyl alcohol copolymer solution obtained in the saponification step is pelletized to give hydrous pellets of EVOH (A).

In the pelletization step, an operation of the pelletization for obtaining the hydrous pellets of EVOH (A) from the solution of the ethylene-vinyl alcohol copolymer (A) is not particularly limited, and a well-known method such as a method including extruding the solution of the ethylene-vinyl alcohol copolymer (A) into a coagulation bath containing a cooled poor solvent to give a strand form thereby allowing for cooling and hardening followed by cutting with a strand cutter to obtain circular cylindrical hydrous pellets of EVOH (A), or a method including similarly extruding the solution of the ethylene-vinyl alcohol copolymer (A) into a coagulation bath and immediately thereafter cutting the ethylene-vinyl alcohol copolymer (A) with a revolving blade or the like to obtain flat spherical to spherical hydrous pellets of EVOH (A) may be used. Alternatively, a method including bringing the solution of the ethylene-vinyl alcohol copolymer (A) into contact with water vapor to give a hydrous resin composition of EVOH (A) beforehand according to a method disclosed in Japanese Unexamined Patent Application, Publication No. 2002-121290 and the like, followed by cutting the same to obtain hydrous pellets of EVOH (A), and the like may be suitably used.

The moisture content in the hydrous pellets of EVOH (A) obtained by these methods is preferably 50 to 200% by mass, more preferably 60 to 180% by mass, and still more preferably 70 to 150% by mass, on dry weight basis of EVOH.

Step 4

It is preferred that the hydrous pellets of EVOH (A) obtained in the pelletization step is finally dried in the drying step to give pellets of the resin composition containing EVOH (A). For the purpose of preventing troubles in molding such as generation of voids due to foaming during molding processing, and the like, the moisture content in the pellets of the resin composition containing EVOH (A) after drying is preferably 1.0% by mass or less, more preferably 0.8% by mass or less, and still more preferably 0.5% by mass or less with respect to the total of the resin composition pellets containing EVOH (A).

A drying method of the hydrous pellets of EVOH (A) is not particularly limited, and any well-known various types of method may be used. Exemplary suitable drying methods include drying by leaving to stand, fluidized drying, and the like. These drying methods may be used either alone, or a plurality of the methods may be employed in combination such as e.g., carrying out fluidized drying first, and thereafter drying by leaving to stand. The drying treatment may be carried by either a continuous system or a batchwise system, and when a plurality of drying methods are employed in combination, either a continuous system or a batchwise system may be freely selected for each drying method.

Mixing Step

As the mixing step carried after the pelletization step, (1) a method of bringing the hydrous pellets of EVOH (A) into contact with a solution containing the compound (B), (2) a method of melt kneading the hydrous pellets of EVOH (A) and the compound (B) in an extruder such as a twin-screw extruder, and the like may be suitably employed. It should be noted that in this step, the compound (B), and as needed a carboxylic acid compound and the like may be concomitantly mixed with EVOH (A).

As a method of carrying out the mixing step after the pelletization step, a method including immersing the hydrous pellets into a solution containing the compound (B) after the pelletization step and before the drying step is preferred. According to the method, the compound (B) can be efficiently admixed into the EVOH resin composition, and the EVOH resin composition accompanied by less yellowing which may occur during melt molding can be more efficiently produced.

When the hydrous pellets of EVOH (A) are immersed in a solution containing the compound (B) and as needed other component, the hydrous pellets employed may have an arbitrary shape such as powdery, granular, spherical, circular cylindrical chip shape, and the like. Moreover, any method according to either a batchwise system or a continuous system may be employed for this operation. When the batchwise system is employed, a mass ratio (bath ratio) of EVOH (A) in the hydrous pellets of EVOH (A) to the solution containing each component is preferably 3 or greater, more preferably 10 or greater, and still more preferably 20 or greater. When the continuous system is employed, a conventionally well-known tower type apparatus may be suitably used. A preferred range of the immersion time period may vary depending on the shape of the hydrous pellets, and typically, when the hydrous pellets of EVOH (A) are particulate having a mean diameter of about 1 to 10 mm, the immersion time period is 1 hour or more, and preferably 2 hrs or more.

In the immersion treatment into the solution, a plurality of aliquots in which each component to be included in the resin composition containing EVOH (A) is dissolved alone, respectively, may be used for the immersion, or the treatment may be carried out once using a liquid in which a plurality of components are dissolved, and carrying out the treatment using a solution containing all the components other than EVOH (A) is preferred in light of simplification of the steps.

When the solution containing each component other than EVOH (A) is obtained, each component may be each independently dissolved in a solvent; however, some components can form a salt with one another. The solution may contain carbon dioxide and/or carbonic acid, and the method for including carbon dioxide and/or carbonic acid may be exemplified by a method disclosed in, for example, PCT International Publication No. 03/068847. Total concentration of free carbon dioxide and carbonic acid in an aqueous solution is preferably 0.5 mmol/L or greater, more preferably 2 mmol/L or greater, and still more preferably 10 mmol/L or greater. In order to increase the solubility of carbon dioxide, the treatment may be carried out under pressurizing conditions of about 1.5 to 10 atm. The concentration of each of other components in the solution is not particularly limited, and may be appropriately adjusted such that an intended content is attained in a finally obtained EVOH resin composition. Although the solvent of the solution is not particularly limited, water is preferred for the reasons in handling and the like.

Furthermore, when the hydrous pellets of EVOH (A) and the compound (B) are melt kneaded in an extruder in the mixing step, for example, a method disclosed in Japanese Unexamined Patent Application, Publication No. 2002-284811 and the like is preferably employed.

In the method for producing an EVOH resin composition according to the embodiment of the present invention, it is also preferred that the compound (B) is mixed in the pelletization step. When the compound (B) is mixed with EVOH (A) in the pelletization step, the compound (B) can be uniformly included in the hydrous pellets of EVOH (A). Specifically, for example, a method including pelletizing the ethylene-vinyl alcohol copolymer (A) obtained in the saponification step and the compound (B) using a twin-screw extruder to obtain hydrous pellets containing the ethylene-vinyl alcohol copolymer (A) and the compound (B), and the like may be employed. In this process, the compound (B) is preferably added in a state of an aqueous solution.

Molded Product

The EVOH resin composition of the embodiment of the present invention is formed into any of various types of a molded product such as a film, sheet, container, pipe or fiber by melt molding. It is possible to subject these molded articles to remolding for the purpose of reuse of the same after grinding. Alternatively, the film, sheet, fiber or the like can also be uniaxially or biaxially stretched. As the melt molding process, extrusion molding, inflation extrusion, blow molding, melt spinning, injection molding and the like are permitted.

Multilayer Structure

The multilayer structure of the embodiment of the present invention is a multilayer structure provided with at least one layer obtained from the EVOH resin composition of the embodiment of the present invention. The layer structure of the multilayer structure is not particularly limited; however, provided that: a layer obtained from the EVOH resin composition of the embodiment of the present invention is designated as E; a layer obtained from an adhesive resin is designated as Ad; and a layer obtained from a thermoplastic resin is designated as T, examples of the layer structure include T/E/T, E/Ad/T, T/Ad/E/Ad/T, and the like. Each layer of these may be either a monolayer, or a multilayer.

The method for producing the multilayer structure is not particularly limited. For example, a method of melt extruding a thermoplastic resin onto a molded article obtained from the EVOH resin composition of the embodiment of the present invention (film, sheet. Etc.); a method of coextruding the EVOH resin composition of the embodiment of the present invention and other thermoplastic resin; a method of coinjecting the EVOH resin composition of the embodiment of the present invention with a thermoplastic resin; a method of laminating a molded article formed from the EVOH resin composition of the embodiment of the present invention and a film or a sheet of other base material using a well-known adhesive such as an organic titanium compound, an isocyanate compound or a polyester based compound; and the like may be exemplified.

Among these methods, a method of coextruding the EVOH resin composition of the embodiment of the present invention and other thermoplastic resin is preferably used. The EVOH resin composition of the embodiment of the present invention is superior in long-run workability and appearance characteristics, and in particular, coloring is less likely to occur even if melted at a comparatively high temperature. Therefore, even if the EVOH resin composition of the embodiment of the present invention and other thermoplastic resin having a comparatively high melting temperature are coextruded, a multilayer structure being accompanied by suppressed occurrence of coloring such as yellowing, and being superior in the appearance can be obtained.

Examples of the thermoplastic resin used for other layer in the multilayer structure include homopolymers of an olefin or copolymers thereof such as linear low density polyethylene, low density polyethylene, medium density polyethylene, high density polyethylene, ethylene-vinyl acetate copolymers, ethylene-propylene copolymers, polypropylene and propylene-α-olefin copolymers (α-olefin having 4 to 20 carbon atoms), polybutene, polypentene, polyesters such as polyethylene terephthalate, polyester elastomers, polyamides such as nylon-6 and nylon-6,6, polystyrene, polyvinyl chloride, polyvinylidene chloride, acrylic resins, vinyl ester based resins, polyurethane elastomers, polycarbonate, chlorinated polyethylene, chlorinated polypropylene, and the like. Of these, polypropylene, polyethylene, ethylene-propylene copolymers, ethylene-vinyl acetate copolymers, polyamides, polystyrene, polyesters are preferably used.

The aforementioned adhesive resin is not particularly limited as long as it has adhesiveness with the EVOH resin composition of the embodiment of the present invention and the thermoplastic resin, but adhesive resins containing a carboxylic acid modified polyolefin are preferred. As the carboxylic acid modified polyolefin, a carboxyl group-containing modified olefin-derived polymer can be suitably used which is obtained by allowing an ethylenic unsaturated carboxylic acid, or an ester or an anhydride thereof to be chemically bonded (for example, an addition reaction, a grafting reaction, etc.) to an olefin-derived polymer. The olefin-derived polymer as referred to herein means polyolefins such as polyethylene (low pressure, middle pressure, high pressure), linear low density polyethylene, polypropylene and polybutene, copolymers (for example, ethylene-vinyl acetate copolymers, ethylene-ethyl acrylate copolymers, etc.) of olefin and other monomer (vinyl ester, unsaturated carboxylic acid ester, etc.). Among these, linear low density polyethylene, ethylene-vinyl acetate copolymers (content of vinyl acetate being 5 to 55% by mass) and ethylene-ethyl acrylate copolymers (content of ethyl acrylate being 8 to 35% by mass) are preferred, and linear low density polyethylene and ethylene-vinyl acetate copolymers are particularly preferred. As the ethylenic unsaturated carboxylic acid, or an ester or an anhydride thereof, ethylenic unsaturated monocarboxylic acids, or esters thereof, ethylenic unsaturated dicarboxylic acids, or mono- or diesters thereof, or anhydrides of the same are exemplified, and of these, ethylenic unsaturated dicarboxylic acid anhydrides are preferred. Specifically, maleic acid, fumaric acid, itaconic acid, maleic anhydride, itaconic anhydride, maleic acid monomethyl ester, maleic acid monoethyl ester, maleic acid diethyl ester, fumaric acid monomethyl ester and the like are included, and particularly, maleic anhydride is suitable.

The amount of the ethylenic unsaturated carboxylic acid or an anhydride thereof added or grafted to the olefin-derived polymer (degree of modification) is 0.0001 to 15% by mass, preferably 0.001 to 10% by mass with respect to the olefin-derived polymer. The addition reaction and the grafting reaction of the ethylenic unsaturated carboxylic acid or an anhydride thereof to the olefin-derived polymer may be carried out, for example, by a radical polymerization method or the like in the presence of a solvent such as xylene, and a catalyst such as a peroxide. The carboxylic acid-modified polyolefin obtained in this manner has a melt flow rate (MFR) as measured at 210° C. of preferably 0.2 to 30 g/10 min, and more preferably 0.5 to 10 g/10 min. These adhesive resins may be used either alone, or two or more types thereof may be used as a mixture.

Although the process for coextrusion of the EVOH resin composition of the embodiment of the present invention and the thermoplastic resin, etc., is not particularly limited, a multimanifold-merging T die method, a feed block-merging T die method, an inflation method, and the like may be exemplified.

By subjecting thus obtained coextrusion multilayer structure to secondary processing, various types of molded products (films, sheets, tubes, bottles, etc.) can be obtained. The various types of molded products include, for example, the followings:

(1) multilayer costretched sheets or films obtained by uniaxially or biaxially stretching a multilayer structure (sheet or film, etc.), followed by subjecting to a heat treatment;

(2) multilayer rolled sheets or films obtained by rolling a multilayer structure (sheet or film, etc.);

(3) multilayer tray cup shaped containers obtained by subjecting a multilayer structure (sheet or film, etc.) to a hot forming process such as vacuum forming, air-pressure forming or vacuum air-pressure forming; and (4) bottles, cup shaped containers and the like obtained by stretch blow molding or the like of a multilayer structure (pipe, etc.).

Note that the secondary processing is not limited to each process illustrated for obtaining the molded product described above, and for example, any well-known secondary processing other than the aforementioned processes such as blow molding may be used ad libitum.

Since the multilayer structure has a layer obtained from an EVOH resin composition having superior appearance characteristics and long-run workability, it is accompanied by fewer fish-eye, gel and seed (dirt under paint) and less coloring such as yellowing and thus, for example, can be suitably used as a food container and the like such as a deep draw container, a cup shape container, and a bottle.

EXAMPLES

Hereinafter, the present invention will be explained in more detail by way of Example, but the present invention is not limited to these Examples.

In the following Examples and Comparative Examples, analyses and evaluations of the EVOH resin compositions, etc., were carried out according to methods described below, respectively.

(1) Measurement of Moisture Content of Hydrous EVOH Pellets

The moisture content of the hydrous EVOH pellets was measured using Halogen Moisture Analyzer "HR73" manufactured by Mettler-Toledo International Inc. under conditions involving a drying temperature of 180° C., a drying time period of 20 min and a sample amount of about 10 g. The moisture content of the hydrous EVOH shown below is presented by % by mass on dry weight basis of EVOH.

(2) Ethylene Content and Degree of Saponification of EVOH (A)

Dry EVOH pellets were ground by freeze grinding. Thus resulting ground EVOH was sieved with a sieve having a nominal dimension of 1 mm (according to normal sieve standard JIS-Z8801). EVOH powder passed through the sieve in an amount of 5 g was immersed in 100 g of ion exchanged water, and the mixture was stirred at 85° C. for 4 hours, followed by an operation of dewatering and drying repeated twice. Using thus obtained EVOH powder after washing, measurement of $^1$H-NMR was carried out under the following measurement conditions, and the ethylene content and the degree of saponification were determined by the analysis method described below.

Measurement Conditions
Name of apparatus: NMR spectrometer "Lambda 500" manufactured by JEOL Ltd
Observation frequency: 500 MHz
Solvent: DMSO-d6
Polymer concentration: 4% by mass
Measurement temperature: 40° C. and 95° C.
Cumulated number: 600 times
Pulse delay time: 3.836 sec
Sample rotation speed: 10 to 12 Hz
Pulse width (90° pulse): 6.75 μsec Analysis Method By the measurement at 40° C., a peak of hydrogen in water molecules was found at around 3.3 ppm, which overlapped with a peak in the range of 3.1 to 3.7 ppm among peaks of methine hydrogen of the vinyl alcohol units of EVOH. On the other hand, when measured at 95° C., the overlapping caused at 40° C. could be obviated; however, a peak of hydrogen of the hydroxyl groups of the vinyl alcohol units of EVOH was present at around 4 to 4.5 ppm, which overlapped with the range of 3.7 to 4 ppm of peaks of methine hydrogen of vinyl alcohol units of EVOH. Accordingly, for quantitative determination of methine hydrogen of vinyl alcohol units of EVOH (3.1 to 4 ppm), measurement data at 95° C. were employed with respect to the range of 3.1 to 3.7 ppm, and measurement data at 40° C. were employed with respect to the range of 3.7 to 4 ppm in order to avoid overlapping with peaks of hydrogen of water or hydroxyl groups. Thus, the total amount of the methine hydrogen was quantitatively determined in terms of the total value of these measurements. Note that the peak of hydrogen of water or hydroxyl group has been known to shift to a high magnetic field side by elevating the measurement temperature. Therefore, analyses were conducted as in the following using both measurement results at 40° C. and 95° C. From the spectrum obtained at 40° C. as described above, an integrated value ($I_1$) of the peak of the chemical shift at 3.7 to 4 ppm, and an integrated value ($I_2$) of the peak of the chemical shift at 0.6 to 1.8 ppm were determined.

On the other hand, from the spectrum obtained at 95° C., an integrated value ($I_3$) of the peak of the chemical shift at 3.1 to 3.7 ppm, an integrated value ($I_4$) of the peak of the chemical shift at 0.6 to 1.8 ppm, and an integrated value ($I_5$) of the peak of the chemical shift at 1.9 to 2.1 ppm were determined. In this process, the peak of the chemical shift at 0.6 to 1.8 ppm principally derives from methylene hydrogen, whereas the peak of the chemical shift at 1.9 to 2.1 ppm derives from methyl hydrogen in unsaponified vinyl acetate units. From these integrated values, the ethylene content and the degree of saponification were calculated according to the following formulae.

$$\text{Ethylene content (mol \%)} = \frac{3I_2I_4 - 6I_1I_4 + 6I_2I_3 + 2I_2I_5}{3I_2I_4 + 6I_1I_4 + 18I_2I_3 + 6I_2I_5} \times 100$$

$$\text{Degree of saponification (mol \%)} = \frac{I_1/I_2 + I_3/I_4}{I_1/I_2 + I_3/I_4 + I_5/3I_4} \times 100$$

(3) Quantitative Determination of Compound Having an Enediol Structure (B)

The dry EVOH pellets were ground by freeze grinding. Thus resulting ground EVOH was sieved with a sieve having a nominal dimension of 1 mm (according to normal sieve standard JIS-Z8801). EVOH powder passed through the sieve in an amount of 5 g and 10 mL of ion exchanged water were charged into a 100 mL stoppered Erlenmeyer flask equipped with a cooling condenser, and the mixture was stirred at 95° C. for 10 hrs to execute extraction. The extraction liquid thus obtained was filtered through a glass filter. To other 300 mL Erlenmeyer flask was charged 20 mg of 1,1-diphenyl-2-picrylhydrazyl manufactured by Wako Pure Chemical Industries, Ltd., and dissolved in 100 mL of ion exchanged water (hereinafter, may be referred to as "aqueous DPPH solution"). The extraction liquid after the filtration prepared previously was transferred in a volume of 3 mL into a 10 mL Erlenmeyer flask using a transfer pipet, and further 3 mL of the aqueous DPPH solution was added thereto using a transfer pipet. After the mixture was left to stand for 5 min, the absorbance at 513 nm was measured with a spectrophotometer UV-2450 manufactured by Shimadzu Corporation, and the absorbance was designated as $A_1$. Also, into another 10 mL Erlenmeyer flask were added 3 mL of ion exchanged water and 3 mL of the aqueous DPPH solution using a transfer pipet, and after the mixture was left to stand for 5 min, the absorbance at 513 nm was measured, which was designated as $A_2$. Similarly, 3 mL of an aqueous solution containing a known concentration of the compound having an enediol structure (B) was charged into a 10 mL Erlenmeyer flask, and 3 mL of the aqueous DPPH solution was added. After the mixture was left to stand for 5 min, the absorbance at 513 nm was measured, which was designated as $A_3$. Using a calibration curve derived from the difference between $A_3$ and $A_2$, a content [B] mol/g of the compound having an enediol structure (B) was calculated from the difference between $A_1$ and $A_2$. It is to be noted that when the absorbance exceeded 1.0, the absorbance was measured after the prepared liquid was appropriately diluted in ion exchanged water.

(4) Molar Ratio ([B]/[VA]) of Compound Having an Enediol Structure (B) to Vinyl Alcohol Unit [VA] of Ethylene-Vinyl Alcohol Copolymer (A)

The ethylene content of EVOH (A) obtained as described above was designated as $P_{Et}$ mol %, the degree of saponification was designated as DS mol %, and the content of the vinyl alcohol unit included per unit weight was designated as [VA] mol/g. Provided that the molecular weight of the vinyl alcohol unit and the molecular weight of the ethylene unit were 44.0 and 28.0, respectively, [B]/[VA] can be derived in accordance with the following formula.

$$\frac{[B]}{[VA]} = [B] \times \frac{(28.0 \times P_{Et}/100 + 44.0 \times (100 - P_{Et})/100}{(100 - P_{Et})/100 \times DS/100}$$

(5) Quantitative Determination of Carboxylic Acids and Carboxylic Acid Ions

The dry EVOH pellets were ground by freeze grinding. The ground EVOH thus obtained was sieved with a sieve having a nominal dimension of 1 mm (according to normal sieve standard JIS-Z8801). EVOH powder passed through the sieve in an amount of 10 g and 50 mL of ion exchanged water were charged into a 100 mL stoppered Erlenmeyer flask equipped with a cooling condenser, and the mixture was stirred at 95° C. for 10 hours to execute heat extraction. Thus obtained extract in a volume of 2 mL was diluted with 8 mL of ion exchanged water. Thus diluted extract was subjected to a quantitative analysis using Ion Chromatography "ICS-1500" manufactured by Yokogawa Electric Corporation to quantitatively determine the amount of carboxylic acid ions, and the amount of carboxylic acids and the carboxylic acid ions. Note that in the quantitative determination, a calibration curve produced using each monocarboxylic acid or multivalent carboxylic acid was employed.

Ion Chromatography Measurement Condition
Column: IonPac "ICE-AS-1" manufactured by Dionex
Eluent: 1.0 mmol/L octanesulfonic acid solution
Measurement temperature: 35° C.
Eluent flow rate: 1 mL/min.
Amount of injected sample: 50 μL (6) Quantitative Determination of Metal Ion, Phosphoric Acid Compound and Boron Compound Dry EVOH pellets in an amount of 0.5 g were charged into a Teflon (registered trademark) pressure resistant container manufactured by ACTAC Co., Ltd., and 5 mL of nitric acid of Super Special Grade manufactured by Wako Pure Chemical Industries, Ltd. was added thereto. After leaving to stand for 30 min, the container was covered by a cap lip having a rupture disc, and then the dry EVOH pellets were degraded by subjecting to a treatment at 150° C. for 10 min, and then at 180° C. for 10 min in a microwave high speed degradation system "Speed Wave MWS-2" manufactured by ACTAC Co., Ltd. When the degradation of the dry EVOH pellets was not completed, the treatment conditions were appropriately adjusted. After diluting in 10 mL of ion exchanged water, all the liquid was transferred into a 50 mL volumetric flask, and the volume was adjusted with ion exchanged water to obtain a degradation solution.

The degradation solution was subjected to a quantitative analysis using an ICP emission spectrophotometer "Optima 4300 DV" manufactured by PerkinElmer Japan Co., Ltd., at each observation wavelength shown below, whereby the amount of each metal ion, phosphoric acid compound and boron compound was quantitatively determined. The amount of the phosphoric acid compound was derived by quantitatively determining the phosphorus element, and calculating in terms of phosphate radical. The content of the boron compound was derived in terms of boron element equivalent.

Na: 589.592 nm
K: 766.490 nm
Mg: 285.213 nm
Ca: 317.933 nm
P: 214.914 nm
B: 249.667 nm (7) Measurement of Extinction Coefficient Ratio ε2/ε1

Using 30 g of each EVOH pellets after drying which were obtained in Examples and Comparative Examples, a heat treatment was carried out in the air at 120° C. for 24 hrs. The EVOH pellets before and after the heat treatment were each ground by freeze grinding. The ground EVOH thus obtained was sieved with a sieve having a nominal dimension of 1 mm (according to normal sieve standard JIS-Z8801). To EVOH powder passed through the sieve in an amount of 1 g was added 10 mL of 55% by mass aqueous 1-propanol solution, and the mixture was heated at 75° C. for 3 hrs to permit dissolution. The resulting solution was placed into a quartz cell having a light path length of 1.0 cm, and the absorbance at 225 nm was measured with a spectrophotometer UV-2450 manufactured by Shimadzu Corporation. Evaluations were made on the pellets obtained in Examples and Comparative Examples, and on the pellets further subjected to a heat treatment. Thus, each extinction coefficient was calculated. According to this process, the extinction coefficients is a value represented by the following formula (1):

$$\epsilon = A/(L \times C) \qquad (1)$$

in the formula, A represents the at absorbance of light at 225 nm measured with an absorption photometer, L represents a light path length (unit: cm), and C represents the concentration of the ethylene-vinyl alcohol copolymer resin composition (% by mass).

A ratio $\epsilon 2/\epsilon 1$ of the extinction coefficient $\epsilon 1$ of the EVOH pellets obtained from the analysis results to the extinction coefficient $\epsilon 2$ of the pellets subjected to the heat treatment was calculated. In addition, when the absorbance exceeds 1.0, the absorbance was measured after appropriately diluting the prepared EVOH solution in a 55% by mass aqueous 1-propanol solution.

(8) Measurement of pH

The dry EVOH pellets were ground by freeze grinding. The ground EVOH thus obtained was sieved with a sieve having a nominal dimension of 1 mm (according to normal sieve standard JIS-Z8801). EVOH powder passed through the sieve in an amount of 10 g and 50 mL of ion exchanged water were charged into a 100 mL stoppered Erlenmeyer flask equipped with a cooling condenser, and the mixture was stirred at 95° C. for 4 hours to execute heat extraction. The pH of the extraction liquid obtained above was measured with MA235/Ion Analyzer manufactured by Mettler-Toledo International Inc.

(9) Evaluation of Appearance of EVOH Resin Composition

Each state of coloring of 50 g of each of the EVOH pellets after drying obtained in Examples and Comparative Examples was visually observed, and evaluated as follows.
Evaluation: Criteria
 A: hardly colored;
 B: slightly colored;
 C: colored (pale yellow);
 D: colored (yellow); and
 E: intensely colored (orange).

Furthermore, a heat treatment was carried out in the air at 120° C. for 24 hrs, and the state of coloring was visually observed similarly to the method described above and then similarly evaluated. It is to be noted the air as used herein mainly contains oxygen and nitrogen, with the oxygen concentration being 18% by volume or greater and 24% by volume or less.

(10) Evaluation of Quality Unevenness of EVOH Resin Composition

Quality unevenness resulting from the difference in residence time in a dryer and the like was evaluated as follows on the basis of an evaluation of the appearance of the EVOH resin composition.
Evaluation: Criteria
 A: no difference of the rank found between before and after the heat treatment;
 B: one difference of the rank found between before and after the heat treatment; and
 C: two differences of the rank found between before and after the heat treatment.

(11) Evaluation of Coloring Resistance in Melt Molding

Each of the EVOH pellets after drying which were obtained in Examples and Comparative Examples in an amount of 50 g was subjected to a heat treatment in the air at 120° C. for 24 hrs. Using 10 g of each of the EVOH resin composition pellets before and after the heat treatment, a sample having a discoid shape with a thickness of 2 mm was produced by hot melting at 240° C. for 5 min with a heating compression equipment. The state of coloring of the resulting sample having a discoid shape was visually observed, and evaluated as follows.

Evaluation: Criteria
 A: hardly colored;
 B: slightly colored;
 C: colored (pale yellow);
 D: colored (yellow); and
 E: intensely colored (orange).

(12) Evaluation of Quality Unevenness in Melt Molding

Quality unevenness in the melt molding resulting from the difference in residence time and the like in the dryer was evaluated as follows on the basis of an evaluation of the adhesion resistance in the melt molding.
Evaluation: Criteria
 A: no difference of the rank found between before and after the heat treatment;
 B: one difference of the rank found between before and after the heat treatment; and
 C: two differences of the rank found between before and after the heat treatment.

(13) Long-Run Workability (Viscosity Stability)

A change in torque when 60 g of the obtained dry EVOH pellets was kneaded using a Laboplast Mill (manufactured by Toyo Seiki Seisaku-sho, Ltd. "20R200"; twin-screw, counter rotating type) at 100 rpm and 240° C. was measured. The torque was measured after 5 min from the beginning of kneading, and a time period was determined which was required until the torque value reached 1.5 times the aforementioned torque value after 5 min from the beginning. This time period being longer indicates less change in the viscosity, and more superior long-run workability.
Evaluation: Criteria
 A: 60 min or longer;
 B: 40 min or longer and shorter than 60 min; and
 C: 20 min or longer and shorter than 40 min

(14) Adhesiveness

Using the dry EVOH pellets obtained, linear low density polyethylene (LLDPE: "Ultzex 2022L" manufactured by Mitsui Chemicals, Inc.) and an adhesive resin ("Bondine TX8030" manufactured by Arkema Inc., hereinafter, may be abbreviated as "Ad"), a multilayer film including five layers each selected from the three (LLDPE/Ad/EVOH/Ad/LLDPE=50 μm/10 μm/10 μm/10 μm/50 μm) was obtained according to the following method and conditions. The resultant multilayer film was cut out in the lengths of 150 mm along the machine direction (MD) and 10 mm along the traverse direction (TD) soon after forming the multilayer film. Immediately thereafter, the peel strength between the EVOH layer and the Ad layer was measured by means of an autograph ("DCS-50M" manufactured by Shimadzu Corporation) at a tensile rate of 250 mm/min, with a T-peel mode, and an evaluation was made as follows in accordance with the extent of peel strength.
Conditions for Forming Multilayer Film
 Extruder:
  for EVOH: 20 mmφ extruder for laboratory use, "ME type CO-EXT" (manufactured by Toyo Seiki Seisaku-sho, Ltd.,)
  for Ad: 20 mmφ extruder, SZW20GT-20MG-STD (manufactured by (Tekunoberu Co., Ltd.)
  for LLDPE: 32 mmφ extruder GT-32-A (manufactured by Research Laboratory of Plastics Technology Co., Ltd.)
 EVOH extrusion temperature:
  feeding zone/compression zone/metering zone/die=175/210/220/220° C.
 Ad extrusion temperature:
  feeding zone/compression zone/metering zone/die=100/160/220/220° C.
 LLDPE extrusion temperature;

feeding zone/compression zone/metering zone/die=150/ 200/210/220° C.

Die: coat hanger die having a width of 300 mm (manufactured by Research Laboratory of Plastics Technology Co., Ltd.)

Evaluation Criteria of Adhesiveness
Evaluation: Criteria
A: 500 g/15 cm or greater
B: 400 g/15 cm or greater and less than 500 g/15 cm
C: 300 g/15 cm or greater and less than 400 g/15 cm
D: less than 300 g/15 cm Synthesis Example 1: Synthesis of Hydrous EVOH Pellets Polymerization for Obtaining an Ethylene-Vinyl Acetate Copolymer To a 250 L pressure reactor equipped with a stirrer, a nitrogen feed port, an ethylene feed port, an initiator addition port and a delay (consecutive addition) solution addition port were charged 85.3 kg of vinyl acetate and 21.6 kg of methanol, and the temperature was elevated to 60° C. Thereafter, the system was substituted with nitrogen by nitrogen bubbling for 60 min. Next, ethylene was charged such that the reactor pressure became 3.7 MPa. An initiator solution having a concentration of 1.9 g/L was prepared by dissolving 2,2'-azobis(4-methoxy-2,4-dimethylvaleronitrile) (AMV) in methanol, and the solution was substituted with nitrogen by bubbling nitrogen gas. After the internal temperature of the polymerization bath was adjusted to 60° C., 653 mL of the initiator solution was injected to initiate polymerization. During the polymerization, ethylene was introduced to maintain the reactor pressure of 3.7 MPa and the polymerization temperature of 60° C., and the initiator solution was continuously added at 2,018 mL/hour using the aforementioned initiator solution to perform polymerization. 5.0 hours later, the polymerization was stopped by cooling when the rate of polymerization reached 45%. After the reactor was opened to remove ethylene, nitrogen gas was bubbled to completely eliminate ethylene. Next, the resultant copolymer solution was continuously fed through an upper part of a tower filled with Raschig rings, and methanol was blown through a lower part of the tower. Mixed vapor of methanol and unreacted vinyl acetate monomer was allowed to outflow through the top of the tower, whereby a methanol solution of an ethylene-vinyl acetate copolymer (EVAc) was obtained from which an unreacted vinyl acetate monomer was eliminated through the bottom of the tower.

Saponification

To thus resulting EVAc solution was added methanol to adjust a concentration of 15% by mass. To 266.7 kg of thus prepared methanol solution of EVAc (40 kg of EVAc in the solution) was added 80.6 L of an alkali solution (2 mol/L NaOH solution in methanol, molar ratio relative to vinyl acetate units in EVAc: 0.4) and the mixture was stirred at 60° C. for 4 hours to carry out saponification of EVAc. After 6 hours from starting the reaction, the reaction liquid was neutralized by adding 9.7 kg of acetic acid and 60 L of water to terminate the reaction.

Washing

The neutralized reaction liquid was transferred from the reactor to a metal drum, and left to stand at room temperature for 16 hours, thereby permitting cooling and hardening to give a cake form. Thereafter, the liquid was removed from the resin in the cake form using a centrifugal separator ("H-130" manufactured by Kokusan Centrifuge Co., Ltd., number of revolution: 1,200 rpm). Next, a step of washing the resin with water was conducted for 10 hours in which washing was carried out while continuously supplying ion exchanged water to the central portion of the centrifugal separator from above. The conductivity of the washing liquid after 10 hours from starting washing was 30 µS/cm (measured with "CM-30ET" manufactured by TOA Electronics Ltd.).

Pelletization

Powdery EVOH obtained in this manner was dried using a dryer at 60° C. for 48 hours. Thus dried EVOH in the form of powder in an amount of 20 kg was dissolved in 43 L of a water/methanol mixed solvent (mass ratio: water/methanol=40/60) while stirring at 80° C. for 12 hours. Next, the stirring was stopped, and the temperature of the dissolving vessel was lowered to 65° C. By leaving to stand for 5 hours, degassing of the water/methanol solution of EVOH was carried out, which was then extruded from a die plate provided with a circular opening having a diameter of 3.5 mm into a water/methanol mixed solution (mass ratio: water/methanol=90/10) at 5° C. to allow for coagulation to give a strand form, and cut to obtain hydrous EVOH pellets having a diameter of about 3 mm and a length of about 4 mm.

Purification

An operation of placing 40 kg of thus resulting hydrous EVOH pellets and 150 L of ion exchanged water in a metal drum having a height of 900 mm and an opening diameter of 600 mm, stirring the mixture at 25° C. for 2 hours and eliminating the liquid by a centrifugal separator was repeated twice. Next, an operation of adding 150 L of 1 g/L aqueous acetic acid solution to 40 kg of the hydrous EVOH pellets, stirring the mixture at 25° C. for 2 hours and eliminating the liquid by a centrifugal separator was repeated twice. Furthermore, an operation of adding 150 L of ion exchanged water to 40 kg of the hydrous EVOH pellets, stirring at 25° C. for 2 hours and eliminating the liquid by a centrifugal separator was repeated six times to obtain hydrous EVOH pellets (w-EVOH-1) from which impurities such as byproducts in the saponification step were eliminated. The conductivity of the washing liquid after carrying out the sixth washing was measured with "CM-30° ET" manufactured by TOA Electronics Ltd., and as a result, the washing liquid was revealed to have a conductivity of 3 µS/cm. Thus resulting hydrous EVOH pellets had a water content of 110% by mass.

Synthesis Example 2: Synthesis of Hydrous EVOH Pellets

A methanol solution of EVAc from which an unreacted vinyl acetate monomer was eliminated was obtained by a similar operation to Synthesis Example 1 except that the following changes: the amounts of vinyl acetate and methanol charged in the polymerization for obtaining the ethylene-vinyl acetate copolymer being 71.1 kg and 4.28 kg, respectively; the reactor pressure being 6.65 MPa; the amount of injection of the initiator solution upon initiation of the polymerization (3.0 g/L solution of AMV in methanol) being 1,305 mL; the rate of the initiator solution continuously added being 2,145 mL/hour; and the internal temperature of the polymerization tank being 55° C. were made. In this step, the conversion (rate of polymerization) was 35%.

Next, saponification and washing were carried out by a similar operation to Synthesis Example 1 except that 200.0 kg of the solution of EVAc in methanol (30 kg of EVAc in the solution) was added, the amount of the alkali solution added was changed to 49.8 L, and the amount of acetic acid added in the neutralization was changed to 6.0 kg, whereby powdery EVOH was obtained.

Furthermore, pelletization and purification were carried out by a similar operation to Synthesis Example 1 except that 15 kg of the dried powdery EVOH was changed to that in 23 L of a mixed solution of water and methanol (mass ratio: water/methanol=5/95), whereby hydrous EVOH pellets (w-EVOH-2) were obtained.

Synthesis Example 3: Synthesis of Hydrous EVOH Pellets

A methanol solution of EVAc from which an unreacted vinyl acetate monomer was eliminated was obtained by a similar operation to Synthesis Example 1 except that the following changes: the amounts of vinyl acetate and methanol charged in the polymerization for obtaining the ethylene-vinyl acetate copolymer being 87.8 kg and 7.21 kg, respectively; the reactor pressure being 5.59 MPa; the amount of injection of the initiator solution upon initiation of the polymerization (2.8 g/L solution of AMV in methanol) being 691 mL; and the rate of the initiator solution continuously added being 2,136 mL/hour were made. In this step, the conversion (rate of polymerization) was 45%.

Next, saponification and washing were carried out by a similar operation to Synthesis Example 1 except that 200.0 kg of the solution of EVAc in methanol (30 kg of EVAc in the solution) was added, the amount of the alkali solution added was changed to 55.5 L, and the amount of acetic acid added in the neutralization was changed to 6.7 kg, whereby powdery EVOH was obtained.

Furthermore, pelletization and purification were carried out by a similar operation to Synthesis Example 1 except that 15 kg of the dried powdery EVOH was changed to that in 23 L of a mixed solution of water and methanol (mass ratio: water/methanol=15/85), whereby hydrous EVOH pellets (w-EVOH-3) were obtained.

Synthesis Example 4: Synthesis of Hydrous EVOH Pellets

A methanol solution of EVAc from which an unreacted vinyl acetate monomer was eliminated was obtained by a similar operation to Synthesis Example 1 except that the following changes: the amounts of vinyl acetate and methanol charged in the polymerization for obtaining the ethylene-vinyl acetate copolymer being 86.7 kg and 27.7 kg, respectively; the reactor pressure being 2.98 MPa; the amount of injection of the initiator solution upon initiation of the polymerization (1.5 g/L solution of AMV in methanol) being 700 mL; and the rate of the initiator solution continuously added being 2,166 mL/hour were made. In this step, the conversion (rate of polymerization) was 45%.

Next, saponification and washing were carried out by a similar operation to Synthesis Example 1 except that the amount of the alkali solution added was changed to 82.9 L, and the amount of acetic acid added in the neutralization was changed to 10.0 kg, whereby powdery EVOH was obtained.

Furthermore, pelletization and purification were carried out by a similar operation to Synthesis Example 1 except that the mass ratio of water/methanol of the mixed solution of water and methanol used in dissolving EVOH was changed to 38/62, whereby hydrous EVOH pellets (w-EVOH-4) were obtained.

Synthesis Example 5: Synthesis of Hydrous EVOH Pellets

A methanol solution of EVAc from which an unreacted vinyl acetate monomer was eliminated was obtained by a similar operation to Synthesis Example 1 except that the following changes: the amounts of vinyl acetate and methanol charged in the polymerization for obtaining the ethylene-vinyl acetate copolymer being 101.0 kg and 16.3 kg, respectively; the reactor pressure being 2.89 MPa; the amount of injection of the initiator solution upon initiation of the polymerization (1.5 g/L solution of AMV in methanol) being 627 mL; the rate of the initiator solution continuously added being 1,938 mL/hour; and the reaction time being 5.0 hrs were made. In this step, the conversion (rate of polymerization) was 45%.

Next, saponification and washing were carried out by a similar operation to Synthesis Example 1 except that the amount of the alkali solution added was changed to 84.3 L, and the amount of acetic acid added in the neutralization was changed to 10.1 kg, whereby powdery EVOH was obtained.

Furthermore, pelletization and purification were carried out by a similar operation to Synthesis Example 1 except that the mass ratio of water/methanol of the mixed solution of water and methanol used in dissolving EVOH was changed to 41/59, whereby hydrous EVOH pellets (w-EVOH-5) were obtained.

Example 1

The hydrous EVOH pellets (w-EVOH-1) obtained in Synthesis Example 1 in an amount of 10.5 kg were charged into 94.5 L of an aqueous solution prepared by dissolving each component in water so as to give propyl gallate of 4.8 mg/L, acetic acid of 0.79 g/L, citric acid of 0.10 g/L, sodium acetate of 0.53 g/L, phosphoric acid of 0.012 g/L and boric acid of 0.42 g/L, and immersion was allowed at 25° C. for 6 hrs while stirring the mixture at intervals. Following subjecting the hydrous EVOH pellets after the immersion to dehydration by deliquoring through centrifugation, the hydrous EVOH pellets were dried in a hot-air dryer at 80° C. for 3 hrs and subsequently at 120° C. for 35 hrs to obtain dry EVOH resin composition pellets (dry EVOH pellets).

When the ethylene content and the degree of saponification were analyzed as described above, the ethylene content (Et) was 32.0 mol %, and the degree of saponification (DS) was 99.98 mol % or greater. Additionally, analyses were performed according to the procedures as described above, and consequently, 0.0236 μmol/g of propyl gallate, 8.00 μmol/g of acetic acid and an acetic acid ion, 0.52 μmol/g of citric acid and a citric acid ion, 6.96 μmol/g of a sodium ion, 10 ppm of the phosphoric acid compound in terms of phosphate radical equivalent and 201 ppm of the boron compound in terms of boron element equivalent were contained. The evaluation of each physical property was made according to the procedures as described above. The extinction coefficient ratio of $\epsilon 2/\epsilon 1$ was 1.47. The extracted liquid had a pH of 4.6. With respect to the evaluations of the appearances of the EVOH resin composition before and after the heat treatment, coloring was hardly found, both results fell under the criteria A. Accordingly, the evaluation results of the quality unevenness fell under the criteria A. Melt molding was carried out using the EVOH resin composition before and after the heat treatment, and the coloring resistance was evaluated, both results fell under the criteria A as coloring was hardly found. Accordingly, the evaluation results of quality unevenness in melt molding fell under the criteria A. With respect to the long-run workability, even after 60 min passed, the torque value did not increase by 1.5 times the torque value after 5 min, falling under the criteria A, and regarding the adhesiveness, the peel strength was 510 g/15 cm, falling under the criteria A.

Examples 2 to 50 and Comparative Examples 1 to 4

Dry EVOH resin composition pellets were obtained in a similar manner to Example 1 except that the type of the hydrous EVOH pellets, and the type and amount of each compound blended into the aqueous solution used in Example 1 were changed as shown in Table 1 and Table 4. On each of the resulting EVOH resin composition, results of the analyses of the ethylene content and the like similarly to Example 1 are shown in Table 2 and Table 5, and results of evaluations of coloring resistance and the like are shown in Table 3 and Table 6. Note that EVOHs synthesized in Synthesis Examples 2 to 5 were used in Examples 23 to 26, respectively.

TABLE 1

| | Hydrous EVOH type | Compound having an enediol structure (B) | | Monocarboxylic acid | | Multivalent carboxylic acid | | Alkali metal | | Phosphoric acid | Boric acid |
|---|---|---|---|---|---|---|---|---|---|---|---|
| | | type | concentration (mg/L) | type | concentration (g/L) | type | concentration (g/L) | type | concentration (g/L) | concentration (g/L) | concentration (g/L) |
| Example 1 | w-EVOH-1 | propyl gallate | 4.8 | acetic acid | 0.79 | citric acid | 0.10 | sodium acetate | 0.53 | 0.012 | 0.42 |
| Example 2 | w-EVOH-1 | propyl gallate | 0.011 | acetic acid | 0.79 | citric acid | 0.10 | sodium acetate | 0.53 | 0.012 | 0.42 |
| Example 3 | w-EVOH-1 | propyl gallate | 0.030 | acetic acid | 0.79 | citric acid | 0.10 | sodium acetate | 0.53 | 0.012 | 0.42 |
| Example 4 | w-EVOH-1 | propyl gallate | 0.049 | acetic acid | 0.79 | citric acid | 0.10 | sodium acetate | 0.53 | 0.012 | 0.42 |
| Example 5 | w-EVOH-1 | propyl gallate | 45.9 | acetic acid | 0.79 | citric acid | 0.10 | sodium acetate | 0.53 | 0.012 | 0.42 |
| Example 6 | w-EVOH-1 | propyl gallate | 70.8 | acetic acid | 0.79 | citric acid | 0.10 | sodium acetate | 0.53 | 0.012 | 0.42 |
| Example 7 | w-EVOH-1 | propyl gallate | 93.8 | acetic acid | 0.79 | citric acid | 0.10 | sodium acetate | 0.53 | 0.012 | 0.42 |
| Example 8 | w-EVOH-1 | pyrogallol | 2.8 | acetic acid | 0.79 | citric acid | 0.10 | sodium acetate | 0.53 | 0.012 | 0.42 |
| Example 9 | w-EVOH-1 | catechol | 2.5 | acetic acid | 0.79 | citric acid | 0.10 | sodium acetate | 0.53 | 0.012 | 0.42 |
| Example 10 | w-EVOH-1 | gallic acid | 3.8 | acetic acid | 0.79 | citric acid | 0.10 | sodium acetate | 0.53 | 0.012 | 0.42 |
| Example 11 | w-EVOH-1 | methyl gallate | 4.2 | acetic acid | 0.79 | citric acid | 0.10 | sodium acetate | 0.53 | 0.012 | 0.42 |
| Example 12 | w-EVOH-1 | ethyl gallate | 4.5 | acetic acid | 0.79 | citric acid | 0.10 | sodium acetate | 0.53 | 0.012 | 0.42 |
| Example 13 | w-EVOH-1 | isoamyl gallate | 5.4 | acetic acid | 0.79 | citric acid | 0.10 | sodium acetate | 0.53 | 0.012 | 0.42 |
| Example 14 | w-EVOH-1 | octyl gallate | 6.4 | acetic acid | 0.79 | citric acid | 0.10 | sodium acetate | 0.53 | 0.012 | 0.42 |
| Example 15 | w-EVOH-1 | tannic acid | 38.4 | acetic acid | 0.79 | citric acid | 0.10 | sodium acetate | 0.53 | 0.012 | 0.42 |
| Example 16 | w-EVOH-1 | catechin | 6.5 | acetic acid | 0.79 | citric acid | 0.10 | sodium acetate | 0.53 | 0.012 | 0.42 |
| Example 17 | w-EVOH-1 | epicatechin | 6.5 | acetic acid | 0.79 | citric acid | 0.10 | sodium acetate | 0.53 | 0.012 | 0.42 |
| Example 18 | w-EVOH-1 | epigallocatechin | 6.9 | acetic acid | 0.79 | citric acid | 0.10 | sodium acetate | 0.53 | 0.012 | 0.42 |
| Example 19 | w-EVOH-1 | epigallocatechin | 10.0 | acetic acid | 0.79 | citric acid | 0.10 | sodium acetate | 0.53 | 0.012 | 0.42 |
| Example 20 | w-EVOH-1 | ellagic acid | 6.8 | acetic acid | 0.79 | citric acid | 0.10 | sodium acetate | 0.53 | 0.012 | 0.42 |
| Example 21 | w-EVOH-1 | ascorbic acid | 4.0 | acetic acid | 0.79 | citric acid | 0.10 | sodium acetate | 0.53 | 0.012 | 0.42 |
| Example 22 | w-EVOH-1 | erythorbic acid | 4.0 | acetic acid | 0.79 | citric acid | 0.10 | sodium acetate | 0.53 | 0.012 | 0.42 |
| Example 23 | w-EVOH-2 | propyl gallate | 4.8 | acetic acid | 0.79 | citric acid | 0.10 | sodium acetate | 0.53 | 0.012 | 0.47 |
| Example 24 | w-EVOH-3 | propyl gallate | acetic 4.8 | acid | 0.79 | citric acid | 0.10 | sodium acetate | 0.53 | 0.012 | 0.47 |
| Example 25 | w-EVOH-4 | propyl gallate | 4.8 | acetic acid | 0.79 | citric acid | 0.10 | sodium acetate | 0.53 | 0.012 | 0.20 |
| Example 26 | w-EVOH-5 | propyl gallate | 4.8 | acetic acid | 0.79 | citric acid | 0.10 | sodium acetate | 0.53 | 0.012 | — |
| Comparative Example 1 | w-EVOH-1 | — | — | acetic acid | 0.79 | citric acid | 0.10 | sodium acetate | 0.53 | 0.012 | 0.42 |
| Comparative Example 2 | w-EVOH-1 | propyl gallate | 0.0086 | acetic acid | 0.79 | citric acid | 0.10 | sodium acetate | 0.53 | 0.012 | 0.42 |
| Comparative Example 3 | w-EVOH-1 | propyl gallate | 101 | acetic acid | 0.79 | citric acid | 0.10 | sodium acetate | 0.53 | 0.012 | 0.42 |
| Comparative Example 4 | w-EVOH-1 | resorcinol | 2.5 | acetic acid | 1.79 | citric acid | 1.10 | sodium acetate | 0.53 | 0.012 | 0.42 |

TABLE 2

| | EVOH | | Compound having an enediol structure (B) | | | | Carboxylic acid | | | | | | Metal ion alkali metal | | Phosphoric acid compound | Boron compound |
| | Et (mol %) | DS (mol %) | type | | content (μmol/g) | [B]/[VA] (10⁻⁶) | monocarboxylic acid | | multivalent carboxylic acid | | total amount of carboxylic acid (μmol/g) | type | content (μmol/g) | content*¹ (ppm) | content*² (ppm) |
| | | | | | | | type | content (μmol/g) | type | content (μmol/g) | | | | | |
|---|---|---|---|---|---|---|---|---|---|---|---|---|---|---|---|
| Example 1 | 32.0 | 99.98 | propyl gallate | | 0.0236 | 1.35 | acetic acid | 8.00 | citric acid | 0.52 | 8.52 | Na | 6.96 | 10 | 201 |
| Example 2 | 32.0 | 99.98 | propyl gallate | | 0.0000518 | 0.00296 | acetic acid | 8.00 | citric acid | 0.52 | 8.52 | Na | 6.96 | 10 | 201 |
| Example 3 | 32.0 | 99.98 | propyl gallate | | 0.000146 | 0.00835 | acetic acid | 8.00 | citric acid | 0.52 | 8.52 | Na | 6.96 | 10 | 201 |
| Example 4 | 32.0 | 99.98 | propyl gallate | | 0.000240 | 0.0137 | acetic acid | 8.00 | citric acid | 0.52 | 8.52 | Na | 6.96 | 10 | 201 |
| Example 5 | 32.0 | 99.98 | propyl gallate | | 0.226 | 12.9 | acetic acid | 8.00 | citric acid | 0.52 | 8.52 | Na | 6.96 | 10 | 201 |
| Example 6 | 32.0 | 99.98 | propyl gallate | | 0.349 | 19.9 | acetic acid | 8.00 | citric acid | 0.52 | 8.52 | Na | 6.96 | 10 | 201 |
| Example 7 | 32.0 | 99.98 | propyl gallate | | 0.462 | 26.4 | acetic acid | 8.00 | citric acid | 0.52 | 8.52 | Na | 6.96 | 10 | 201 |
| Example 8 | 32.0 | 99.98 | pyrogallol | | 0.0236 | 1.35 | acetic acid | 8.00 | citric acid | 0.52 | 8.52 | Na | 6.96 | 10 | 201 |
| Example 9 | 32.0 | 99.98 | catechol | | 0.0236 | 1.35 | acetic acid | 8.00 | citric acid | 0.52 | 8.52 | Na | 6.96 | 10 | 201 |
| Example 10 | 32.0 | 99.98 | gallic acid | | 0.0236 | 1.35 | acetic acid | 8.00 | citric acid | 0.52 | 8.52 | Na | 6.96 | 10 | 201 |
| Example 11 | 32.0 | 99.98 | methyl gallate | | 0.0236 | 1.35 | acetic acid | 8.00 | citric acid | 0.52 | 8.52 | Na | 6.96 | 10 | 201 |
| Example 12 | 32.0 | 99.98 | ethyl gallate | | 0.0236 | 1.35 | acetic acid | 8.00 | citric acid | 0.52 | 8.52 | Na | 6.96 | 10 | 201 |
| Example 13 | 32.0 | 99.98 | isoamyl gallate | | 0.0236 | 1.35 | acetic acid | 8.00 | citric acid | 0.52 | 8.52 | Na | 6.96 | 10 | 201 |
| Example 14 | 32.0 | 99.98 | octyl gallate | | 0.0236 | 1.35 | acetic acid | 8.00 | citric acid | 0.52 | 8.52 | Na | 6.96 | 10 | 201 |
| Example 15 | 32.0 | 99.98 | tannic acid | | 0.0236 | 1.35 | acetic acid | 8.00 | citric acid | 0.52 | 8.52 | Na | 6.96 | 10 | 201 |
| Example 16 | 32.0 | 99.98 | catechin | | 0.0236 | 1.35 | acetic acid | 8.00 | citric acid | 0.52 | 8.52 | Na | 6.96 | 10 | 201 |
| Example 17 | 32.0 | 99.98 | epicatechin | | 0.0236 | 1.35 | acetic acid | 8.00 | citric acid | 0.52 | 8.52 | Na | 6.96 | 10 | 201 |
| Example 18 | 32.0 | 99.98 | epigallocatechin | | 0.0236 | 1.35 | acetic acid | 8.00 | citric acid | 0.52 | 8.52 | Na | 6.96 | 10 | 201 |
| Example 19 | 32.0 | 99.98 | epigallocatechin gallate | | 0.0236 | 1.35 | acetic acid | 8.00 | citric acid | 0.52 | 8.52 | Na | 6.96 | 10 | 201 |
| Example 20 | 32.0 | 99.98 | ellagic acid | | 0.0236 | 1.35 | acetic acid | 8.00 | citric acid | 0.52 | 8.52 | Na | 6.96 | 10 | 201 |
| Example 21 | 32.0 | 99.98 | ascorbic acid | | 0.0236 | 1.35 | acetic acid | 8.00 | citric acid | 0.52 | 8.52 | Na | 6.96 | 10 | 201 |
| Example 22 | 32.0 | 99.98 | erythorbic acid | | 0.0236 | 1.35 | acetic acid | 8.00 | citric acid | 0.52 | 8.52 | Na | 6.96 | 10 | 201 |
| Example 23 | 55.0 | 99.98 | propyl gallate | | 0.0236 | 1.35 | acetic acid | 8.00 | citric acid | 0.52 | 8.52 | Na | 6.96 | 10 | 201 |
| Example 24 | 44.0 | 99.98 | propyl gallate | | 0.0236 | 1.35 | acetic acid | 8.00 | citric acid | 0.52 | 8.52 | Na | 6.96 | 10 | 227 |
| Example 25 | 27.0 | 99.98 | propyl gallate | | 0.0236 | 1.35 | acetic acid | 8.00 | citric acid | 0.52 | 8.52 | Na | 6.96 | 10 | 227 |
| Example 26 | 24.0 | 99.98 | propyl gallate | | 0.0236 | 1.35 | acetic acid | 8.00 | citric acid | 0.52 | 8.52 | Na | 6.96 | 10 | 96 |
| Comparative Example 1 | 32.0 | 99.98 | — | | — | — | acetic acid | 8.00 | citric acid | 0.52 | 8.52 | Na | 6.96 | 10 | 201 |
| Comparative Example 2 | 32.0 | 99.98 | propyl gallate | | 0.00000424 | 0.00243 | acetic acid | 8.00 | citric acid | 0.52 | 8.52 | Na | 6.96 | 10 | 201 |
| Comparative Example 3 | 32.0 | 99.98 | propyl gallate | | 0.495 | 28.3 | acetic acid | 8.00 | citric acid | 0.52 | 8.52 | Na | 6.96 | 10 | 201 |
| Comparative Example 4 | 32.0 | 99.98 | resorcinol | | 0.0236 | 1.35 | acetic acid | 8.00 | citric acid | 0.52 | 8.52 | Na | 6.96 | 10 | 201 |

*¹content in terms of phosphate radical
*²content in terms of boron element

TABLE 3

| | Extinction coefficient ratio ($\epsilon 2/\epsilon 1$) | pH | EVOH resin composition evaluation of appearance | | | In melt molding evaluation of coloring resistance | | | Long-run workability | Adhesiveness |
|---|---|---|---|---|---|---|---|---|---|---|
| | | | before heat treatment | after heat treatment | quality unevenness | before heat treatment | after heat treatment | quality unevenness | | |
| Example 1 | 1.47 | 4.6 | A | A | A | A | A | A | A | A |
| Example 2 | 1.68 | 4.6 | B | C | B | B | C | B | A | A |
| Example 3 | 1.65 | 4.6 | B | B | A | A | B | B | A | A |
| Example 4 | 1.58 | 4.6 | A | A | A | A | B | B | A | A |
| Example 5 | 1.75 | 4.6 | A | A | A | B | B | A | A | A |
| Example 6 | 1.93 | 4.6 | B | B | A | B | C | B | A | A |
| Example 7 | 2.11 | 4.6 | B | C | B | C | D | B | A | A |
| Example 8 | 2.08 | 4.6 | B | C | B | C | D | B | A | A |
| Example 9 | 2.06 | 4.6 | B | C | B | C | D | B | A | A |
| Example 10 | 1.51 | 4.6 | A | A | A | A | A | A | A | A |
| Example 11 | 1.58 | 4.6 | A | A | A | A | A | A | A | A |
| Example 12 | 1.59 | 4.6 | A | A | A | A | A | A | B | A |
| Example 13 | 1.56 | 4.6 | A | A | A | A | A | A | B | A |
| Example 14 | 1.53 | 4.6 | A | A | A | A | A | A | A | A |
| Example 15 | 1.57 | 4.6 | A | A | A | A | A | A | A | A |
| Example 16 | 1.58 | 4.6 | A | A | A | A | A | A | B | A |
| Example 17 | 1.53 | 4.6 | A | A | A | A | A | A | B | A |
| Example 18 | 1.55 | 4.6 | A | A | A | A | A | A | A | A |
| Example 19 | 1.56 | 4.6 | A | A | A | A | A | A | A | A |
| Example 20 | 1.58 | 4.6 | A | A | A | A | A | A | B | A |
| Example 21 | 1.59 | 4.6 | A | A | A | A | A | A | A | A |
| Example 22 | 1.52 | 4.6 | A | A | A | A | A | A | A | A |
| Example 23 | 1.58 | 4.6 | A | A | A | A | A | A | A | A |
| Example 24 | 1.52 | 4.6 | A | A | A | A | A | A | A | A |
| Example 25 | 1.56 | 4.6 | A | A | A | A | A | A | B | A |
| Example 26 | 1.59 | 4.6 | A | A | A | A | A | A | B | A |
| Comparative Example 1 | 2.14 | 4.6 | C | E | C | C | E | C | A | A |
| Comparative Example 2 | 2.14 | 4.6 | C | E | C | C | E | C | A | A |
| Comparative Example 3 | 2.14 | 4.6 | C | E | C | C | E | C | A | A |
| Comparative Example 4 | 2.28 | 4.6 | C | E | C | C | E | C | A | A |

TABLE 4

| | Hydrous EVOH (type) | Compound having an enediol structure (B) type | Compound having an enediol structure (B) concentration (mg/L) | Monocarboxylic acid type | Monocarboxylic acid concentration (g/L) | Multivalent carboxylic acid type | Multivalent carboxylic acid concentration (g/L) | Alkali metal type | Alkali metal concentration (g/L) | Alkaline earth metal type | Alkaline earth metal concentration (g/L) | Phosphoric acid concentration (g/L) | Boric acid concentration (g/L) |
|---|---|---|---|---|---|---|---|---|---|---|---|---|---|
| Example 27 | w-EVOH-1 | propyl gallate | 4.8 | acetic acid | 0.0048 | tartaric acid | 0.067 | sodium bicarbonate | 0.27 | — | — | 0.012 | 0.42 |
| Example 28 | w-EVOH-1 | propyl gallate | 4.8 | lactic acid | 0.62 | aspartic acid | 0.43 | sodium acetate | 0.53 | — | — | 0.012 | 0.42 |
| Example 29 | w-EVOH-1 | propyl gallate | 4.8 | capric acid | 1.06 | succinic acid | 0.95 | sodium acetate | 0.53 | — | — | 0.012 | 0.42 |
| Example 30 | w-EVOH-1 | propyl gallate | 4.8 | acetic acid | 1.19 | ethylenediamine tetraacetic acid | 2.07 | sodium acetate | 0.53 | — | — | 0.012 | 0.42 |
| Example 31 | w-EVOH-1 | propyl gallate | 4.8 | acetic acid | 0.62 | citric acid | 0.10 | — | — | — | — | 0.012 | 0.42 |
| Example 32 | w-EVOH-1 | propyl gallate | 4.8 | acetic acid | 0.68 | citric acid | 0.10 | sodium acetate | 0.20 | — | — | 0.012 | 0.42 |
| Example 33 | w-EVOH-1 | propyl gallate | 4.8 | acetic acid | 0.78 | citric acid | 0.10 | potassium acetate | 0.56 | — | — | 0.012 | 0.42 |
| Example 34 | w-EVOH-1 | propyl gallate | 4.8 | acetic acid | 0.80 | citric acid | 0.10 | potassium acetate | 0.71 | — | — | 0.012 | 0.42 |
| Example 35 | w-EVOH-1 | propyl gallate | 4.8 | acetic acid | 0.79 | citric acid | 0.10 | sodium acetate | 0.72 | — | — | 0.012 | 0.42 |
| Example 36 | w-EVOH-1 | propyl gallate | 4.8 | acetic acid | 0.79 | citric acid | 0.10 | sodium acetate | 1.18 | — | — | 0.012 | 0.42 |
| Example 37 | w-EVOH-1 | propyl gallate | 4.8 | acetic acid | 0.79 | citric acid | 0.10 | sodium acetate | 1.60 | — | — | 0.012 | 0.42 |
| Example 38 | W-EVOH-1 | propyl gallate | 4.8 | acetic acid | 0.79 | citric acid | 0.10 | sodium acetate | 0.11 | calcium acetate | 0.16 | 0.012 | 0.42 |
| Example 39 | w-EVOH-1 | propyl gallate | 4.8 | acetic acid | 0.79 | citric acid | 0.10 | sodium acetate | 0.15 | magnesium acetate | 0.48 | 0.012 | 0.42 |
| Example 40 | w-EVOH-1 | propyl gallate | 4.8 | acetic acid | 0.79 | citric acid | 0.10 | sodium acetate | 0.76 | magnesium acetate | 0.73 | 0.012 | 0.42 |
| Example 41 | w-EVOH-1 | propyl gallate | 4.8 | acetic acid | 0.79 | citric acid | 0.10 | sodium acetate | 0.99 | calcium acetate | 1.25 | 0.012 | 0.42 |
| Example 42 | w-EVOH-1 | propyl gallate | 4.8 | acetic acid | 0.79 | citric acid | 0.10 | sodium acetate | 0.53 | — | — | 0.012 | — |
| Example 43 | w-EVOH-1 | propyl gallate | 4.8 | acetic acid | 0.79 | citric acid | 0.10 | sodium acetate | 0.53 | — | — | 0.0073 | — |

TABLE 4-continued

| | Hydrous EVOH (type) | Compound having an enediol structure (B) | | Monocarboxylic acid | | Multivalent carboxylic acid | | Alkali metal | | Alkaline earth metal | | Phosphoric acid concentration (g/L) | Boric acid concentration (g/L) |
|---|---|---|---|---|---|---|---|---|---|---|---|---|---|
| | | type | concentration (mg/L) | type | concentration (g/L) | type | concentration (g/L) | type | concentration (g/L) | type | concentration (g/L) | | |
| Example 44 | w-EVOH-1 | propyl gallate | 4.8 | acetic acid | 0.79 | citric acid | 0.10 | sodium acetate | 0.53 | — | — | 0.058 | 0.90 |
| Example 45 | w-EVOH-1 | propyl gallate | 4.8 | acetic acid | 0.86 | citric acid | 0.10 | potassium acetate | 1.07 | — | — | 0.067 | 1.99 |
| Example 46 | W-EVOH-1 | propyl gallate | 4.8 | acetic acid | 0.79 | citric acid | 0.10 | sodium acetate | 0.53 | — | — | 0.25 | 0.02 |
| Example 47 | w-EVOH-1 | propyl gallate | 4.8 | acetic acid | 0.79 | citric acid | 0.10 | sodium acetate | 0.53 | — | — | 0.62 | 1.03 |
| Example 48 | w-EVOH-1 | propyl gallate | 4.8 | acetic acid | 0.79 | citric acid | 0.10 | sodium acetate | 0.53 | — | — | 0.012 | 2.06 |
| Example 49 | w-EVOH-1 | propyl gallate | 4.8 | acetic acid | 0.79 | citric acid | 0.10 | sodium acetate | 0.53 | — | — | 0.012 | 0.11 |
| Example 50 | w-EVOH-1 | propyl gallate | 4.8 | — | — | — | — | — | — | — | — | — | 0 |

TABLE 5

| | EVOH | | Compound having an enediol structure (B) | | | Carboxylic acid | | | | | Metal ion | | | | | Phosphoric acid compound content*1 (ppm) | Boron compound content*2 (ppm) |
|---|---|---|---|---|---|---|---|---|---|---|---|---|---|---|---|---|---|
| | Et (mol %) | DS (mol %) | type | content (μmol/g) | [B]/[VA] (10⁻⁶) | monocarboxylic acid type | content (μmol/g) | multivalent carboxylic acid type | content (μmol/g) | total amount of carboxylic acid (μmol/g) | alkali metal type | content (μmol/g) | alkaline earth metal type | content (μmol/g) | total amount metal ion (μmol/g) | | |
| Example 27 | 32.0 | 99.98 | propyl gallate | 0.0236 | 1.35 | acetic acid | 0.07 | tartaric acid | 0.44 | 0.51 | Na | 6.96 | — | — | — | 10 | 201 |
| Example 28 | 32.0 | 99.98 | propyl gallate | 0.0236 | 1.35 | lactic acid | 6.50 | aspartic acid | 3.20 | 9.70 | Na | 6.96 | — | — | — | 10 | 201 |
| Example 29 | 32.0 | 99.98 | propyl gallate | 0.0236 | 1.35 | capric acid | 6.0 | succinic acid | 8.0 | 14.0 | Na | 6.96 | — | — | — | 10 | 201 |
| Example 30 | 32.0 | 99.98 | propyl gallate | 0.0236 | 1.35 | acetic acid | 12.0 | ethylenediamine tetraacetic acid | 7.0 | 19.0 | Na | 6.96 | — | — | — | 10 | 201 |
| Example 31 | 32.0 | 99.98 | propyl gallate | 0.0236 | 1.35 | acetic acid | 8.0 | citric acid | 0.52 | 8.52 | — | — | — | — | — | 10 | 201 |
| Example 32 | 32.0 | 99.98 | propyl gallate | 0.0236 | 1.35 | acetic acid | 8.0 | citric acid | 0.52 | 8.52 | Na | 2.60 | — | — | — | 10 | 201 |
| Example 33 | 32.0 | 99.98 | propyl gallate | 0.0236 | 1.35 | acetic acid | 8.0 | citric acid | 0.52 | 8.52 | K | 3.60 | — | — | — | 10 | 201 |
| Example 34 | 32.0 | 99.98 | propyl gallate | 0.0236 | 1.35 | acetic acid | 8.0 | citric acid | 0.52 | 8.52 | K | 4.60 | — | — | — | 10 | 201 |
| Example 35 | 32.0 | 99.98 | propyl gallate | 0.0236 | 1.35 | acetic acid | 8.0 | citric acid | 0.52 | 8.52 | Na | 9.50 | — | — | — | 10 | 201 |
| Example 36 | 32.0 | 99.98 | propyl gallate | 0.0236 | 1.35 | acetic acid | 8.0 | citric acid | 0.52 | 8.52 | Na | 15.5 | — | — | — | 10 | 201 |
| Example 37 | 32.0 | 99.98 | propyl gallate | 0.0236 | 1.35 | acetic acid | 8.0 | citric acid | 0.52 | 8.52 | Na | 21.0 | — | — | — | 10 | 201 |
| Example 38 | 32.0 | 99.98 | propyl gallate | 0.0236 | 1.35 | acetic acid | 8.0 | citric acid | 0.52 | 8.52 | Na | 1.50 | Ca | 1.10 | 2.60 | 10 | 201 |
| Example 39 | 32.0 | 99.98 | propyl gallate | 0.0236 | 1.35 | acetic acid | 8.0 | citric acid | 0.52 | 8.52 | Na | 2.00 | mg | 3.60 | 5.60 | 10 | 201 |
| Example 40 | 32.0 | 99.98 | propyl gallate | 0.0236 | 1.35 | acetic acid | 8.0 | citric acid | 0.52 | 8.52 | Na | 10.0 | mg | 5.50 | 15.5 | 10 | 201 |
| Example 41 | 32.0 | 99.98 | propyl gallate | 0.0236 | 1.35 | acetic acid | 8.0 | citric acid | 0.52 | 8.52 | Na | 13.0 | Ca | 8.50 | 21.5 | 10 | 201 |
| Example 42 | 32.0 | 99.98 | propyl gallate | 0.0236 | 1.35 | acetic acid | 8.0 | citric acid | 0.52 | 8.52 | Na | 6.96 | — | — | — | — | — |
| Example 43 | 32.0 | 99.98 | propyl gallate | 0.0236 | 1.35 | acetic acid | 8.0 | citric acid | 0.52 | 8.52 | Na | 6.96 | — | — | — | 6 | — |

TABLE 5-continued

| | EVOH | | Compound having an enediol structure (B) | | | Carboxylic acid | | | | | Metal ion | | | | | Phosphoric acid compound content*1 (ppm) | Boron compound content*2 (ppm) |
|---|---|---|---|---|---|---|---|---|---|---|---|---|---|---|---|---|---|
| | | | | | | monocarboxylic acid | | multivalent carboxylic acid | | total amount of carboxylic acid (µmol/g) | alkali metal | | alkaline earth metal | | total amount (µmol/g) | | |
| | Et (mol %) | DS (mol %) | type | content (µmol/g) | [B]/[VA] (10⁻⁶) | type | content (µmol/g) | type | content (µmol/g) | | type | content (µmol/g) | type | content (µmol/g) | | | |
| Example 44 | 32.0 | 99.98 | propyl gallate | 0.0236 | 1.35 | acetic acid | 8.0 | citric acid | 0.52 | 8.52 | Na | 6.96 | — | — | — | 48 | 437 |
| Example 45 | 32.0 | 98.98 | propyl gallate | 0.0236 | 1.35 | acetic acid | 8.0 | citric acid | 0.52 | 8.52 | K | 6.96 | — | — | — | 55 | 961 |
| Example 46 | 32.0 | 99.98 | propyl gallate | 0.0236 | 1.35 | acetic acid | 8.0 | citric acid | 0.52 | 8.52 | Na | 6.96 | — | — | — | 210 | 11 |
| Example 47 | 32.0 | 99.98 | propyl gallate | 0.0236 | 1.35 | acetic acid | 8.0 | citric acid | 0.52 | 8.52 | Na | 6.96 | — | — | — | 510 | 498 |
| Example 48 | 32.0 | 99.98 | propyl gallate | 0.0236 | 1.35 | acetic acid | 8.0 | citric acid | 0.52 | 8.52 | Na | 6.96 | — | — | — | 10 | 996 |
| Example 49 | 32.0 | 99.98 | propyl gallate | 0.0236 | 1.35 | acetic acid | 8.0 | citric acid | 0.52 | 8.52 | Na | 6.96 | — | — | — | 10 | 52 |
| Example 50 | 32.0 | 99.98 | propyl gallate | 0.0236 | 1.35 | — | — | — | — | — | — | — | — | — | — | — | — |

*1 content in terms of phosphate radical
*2 content in terms of boron element

TABLE 6

| | EVOH resin composition | | | | In melt molding | | | | |
|---|---|---|---|---|---|---|---|---|---|
| | extinction coefficient | | evaluation of appearance | | | evaluation of coloring resistance | | | Long-run workability | Adhesiveness |
| | ratio (ε2/ε1) | pH | before heat treatment | after heat treatment | quality unevenness | before heat treatment | after heat treatment | quality unevenness | | |
| Example 27 | 1.77 | 6.7 | A | B | B | B | B | A | A | A |
| Example 28 | 1.61 | 4.5 | A | A | A | B | B | A | A | A |
| Example 29 | 1.55 | 4.2 | A | A | A | B | B | A | B | A |
| Example 30 | 1.53 | 3.9 | A | A | A | A | A | A | C | A |
| Example 31 | 1.49 | 4.3 | A | A | A | A | A | A | C | D |
| Example 32 | 1.51 | 4.4 | A | A | A | A | A | A | B | C |
| Example 33 | 1.54 | 4.5 | A | A | A | A | A | A | A | A |
| Example 34 | 1.53 | 4.6 | A | A | A | A | A | A | A | A |
| Example 35 | 1.55 | 4.6 | A | A | A | A | A | A | A | A |
| Example 36 | 1.65 | 4.6 | A | B | B | A | B | B | A | A |
| Example 37 | 1.75 | 4.6 | A | B | B | B | C | B | A | A |
| Example 38 | 1.63 | 4.6 | B | B | B | B | B | B | B | A |
| Example 39 | 1.62 | 4.6 | B | B | B | B | B | B | B | A |
| Example 40 | 1.88 | 4.6 | B | B | B | B | C | B | B | B |
| Example 41 | 1.93 | 4.6 | B | C | B | B | C | B | C | B |
| Example 42 | 1.51 | 4.6 | A | A | A | A | A | A | C | A |
| Example 43 | 1.49 | 4.6 | A | A | A | A | A | A | B | A |
| Example 44 | 1.48 | 4.3 | A | A | A | A | A | A | A | A |
| Example 45 | 1.52 | 4.2 | A | A | A | A | A | A | A | A |
| Example 46 | 1.51 | 4.1 | A | A | A | A | A | A | B | A |
| Example 47 | 1.49 | 3.8 | A | A | A | A | A | A | B | A |
| Example 48 | 1.51 | 4.6 | A | A | A | A | A | A | B | A |
| Example 49 | 1.48 | 4.6 | A | A | A | A | A | A | C | A |
| Example 50 | 1.98 | 4.6 | B | C | B | C | D | B | C | D |

Examples 51 to 53

Dry EVOH resin composition pellets were obtained in a similar manner to Example 1 except that the type of the hydrous EVOH pellets, and the type and amount of each compound blended into the aqueous solution used in Example 1 were changed as shown in Table 7, and that immersion was allowed at 25° C. for 6 hrs while blowing carbon dioxide into the aqueous solution at a rate of 1.0 L/min. On each of the resulting EVOH resin composition, results of the analyses of the ethylene content and the like similarly to Example 1 are shown in Table 8, and results of evaluations of coloring resistance and the like are shown in Table 9.

Example 54

Hydrous EVOH pellets having a moisture content of 50% by mass were obtained by drying w-EVOH-1 obtained in Synthesis Example 1 in a hot-air dryer at 80° C. for 1 hour. The resulting hydrous EVOH pellets were charged into a twin-screw extruder (details shown below) at 10 kg/hour, and with a setting of the resin temperature at the discharge opening of 100° C., an aqueous solution containing 55.6 mg/L propyl gallate, 5.13 g/L acetic acid, 1.11 g/L citric acid, 6.34 g/L sodium acetate, 0.11 g/L phosphoric acid and 12.8 g/L boric acid was added at 0.6 L/hour from a liquid addition port positioned at a tip part on the side of the discharge opening shown in FIG. 1. Molten hydrous EVOH in a strand form discharged from the die was cut with a strand cutter to obtain cylindrical hydrous EVOH pellets (moisture content: 25% by mass). Thus resulting hydrous EVOH pellets were dried in a hot-air dryer at 80° C. for 1 hour, and subsequently at 120° C. for 24 hrs to obtain dry EVOH resin composition pellets. On the resulting EVOH resin composition, results of the analyses of the ethylene content and the like similarly to Example 1 are shown in Table 8, and results of evaluations of coloring resistance and the like are shown in Table 9.

Details of Specification of Twin-Screw Extruder
  Screw Diameter: 30 mmφ
  L/D: 45.5
  Screw: fully intermeshing co-rotation type (details of the structure of the screw shown in FIG. 1)
  Screw rotation speed: 300 rpm
  Die: 3 mmφ; 5-hole strand die
  Drawing speed: 5 m/min.

TABLE 7

| | Hydrous EVOH type | Compound having an enediol structure (B) | | Carbon dioxide | Monocarboxylic acid | | Multivalent carboxylic acid | | Alkali metal | | Phosphoric acid | Boric acid |
|---|---|---|---|---|---|---|---|---|---|---|---|---|
| | | type | concentration (mg/L) | rate of blowing (L/min.) | type | concentration (g/L) | type | concentration (g/L) | type | concentration (g/L) | concentration (g/L) | concentration (g/L) |
| Example 51 | w-EVOH-1 | propyl gallate | 4.78 | 1.0 | acetic acid | 0.79 | citric acid | 0.10 | sodium acetate | 0.53 | 0.012 | 0.011 |
| Example 52 | w-EVOH-1 | propyl gallate | 4.78 | 1.0 | acetic acid | 0.79 | citric acid | 0.10 | sodium acetate | 0.53 | 0.012 | 4.1 |

TABLE 7-continued

| | Hydrous EVOH type | Compound having an enediol structure (B) type | concentration (mg/L) | Carbon dioxide rate of blowing (L/min.) | Monocarboxylic acid type | concentration (g/L) | Multivalent carboxylic acid type | concentration (g/L) | Alkali metal type | concentration (g/L) | Phosphoric acid concentration (g/L) | Boric acid concentration (g/L) |
|---|---|---|---|---|---|---|---|---|---|---|---|---|
| Example 53 | w-EVOH-1 | propyl gallate | 4.78 | 1.0 | — | — | — | — | — | — | — | — |

TABLE 8

| | EVOH Et (mol %) | DS (mol %) | Compound having an enediol structure (B) type | content (μmol/g) | [B]/[VA] ($10^{-6}$) | Carboxylic acid mono-carboxylic acid type | content (μmol/g) | multivalent carboxylic acid type | content (μmol/g) | total amount of carboxylic acid (μmol/g) | Metal ion alkali metal type | content (μmol/g) | Phosphoric acid compound content*[1] (ppm) | Boron compound content*[2] (ppm) |
|---|---|---|---|---|---|---|---|---|---|---|---|---|---|---|
| Example 51 | 32.0 | 99.98 | propyl gallate | 0.0236 | 1.35 | acetic acid | 8.00 | citric acid | 0.521 | 8.52 | Na | 6.96 | 10 | 5 |
| Example 52 | 32.0 | 99.98 | propyl gallate | 0.0236 | 1.35 | acetic acid | 8.00 | citric acid | 0.521 | 8.52 | Na | 6.96 | 10 | 1992 |
| Example 53 | 32.0 | 99.98 | propyl gallate | 0.0236 | 1.35 | — | — | — | — | — | — | — | — | — |
| Example 54 | 32.0 | 99.98 | propyl gallate | 0.0236 | 1.35 | acetic acid | 8.00 | citric acid | 0.521 | 8.52 | Na | 6.96 | 10 | 201 |

*[1] content in terms of phosphate radical
*[2] content in terms of boron element

TABLE 9

| | EVOH resin composition | | | evaluation of appearance | | | In melt molding evaluation of coloring resistance | | | | |
|---|---|---|---|---|---|---|---|---|---|---|---|
| | extinction coefficient ratio ($\epsilon2/\epsilon1$) | pH | before heat treatment | after heat treatment | quality unevenness | before heat treatment | after heat treatment | quality unevenness | Long-run workability | Adhesiveness |
| Example 51 | 1.51 | 4.6 | A | A | A | A | A | A | B | A |
| Example 52 | 1.48 | 4.6 | A | A | A | A | A | A | C | A |
| Example 53 | 2.13 | 6.8 | B | C | B | C | D | B | C | A |
| Example 54 | 1.23 | 4.6 | A | A | A | A | A | A | A | A |

INDUSTRIAL APPLICABILITY

The EVOH resin composition of the embodiment of the present invention has superior appearance characteristics (particularly, absence of coloring and unevenness of the hue), and is accompanied by suppressed occurrence of yellowing, etc., in melt molding; therefore, the EVOH resin composition can be suitably used as a material for molded products that exhibit decreased unevenness of the quality and have superior appearance characteristics, for example, various types of molded products such as films like monolayer or multilayer films, sheets, pipes, containers and fibers.

EXPLANATION OF THE REFERENCE SYMBOLS 1 source material-feeding zone
2, 4, 6 full flight screw part
3, 5 reverse flight screw part
7 vent cylinder zone
8 liquid addition port
9 temperature sensor
10 cylinder barrel
11 discharge opening
20 twin-screw extruder

The invention claimed is:
1. An ethylene-vinyl alcohol copolymer resin composition, comprising:
(A) an ethylene-vinyl alcohol copolymer;
(B) a compound, which is gallic acid, methyl gallate, ethyl gallate, propyl gallate, isoamyl gallate, tannic acid, pyrogallol, catechol, epicatechin, epigallocatechin, epigallocatechin gallate, ellagic acid, a salt thereof, or a combination thereof;
a monocarboxylic acid or a salt thereof, which is acetic acid, lactic acid, capric acid, or a salt thereof, in an amount of 0 μmol/g or greater and 12.0 μmol/g or less in terms of carboxylic acid radical equivalent;

a multivalent carboxylic acid or a salt thereof, which is tartaric acid, aspartic acid, succinic acid, ethylenediamine tetraacetic acid, or a salt thereof, in an amount of 0 μmol/g or greater and 8.0 μmol/g or less in terms of carboxylic acid radical equivalent;

an alkali metal ion, which is a sodium ion or a potassium ion, in an amount of 0 μmol/g or greater and 21.0 mol/g or less; and an alkaline earth metal ion, which is a calcium ion or a magnesium ion, in an amount of 0 μmol/g or greater and 8.50 μmol/g or less, wherein a total amount of metal ions is 22.0 μmol/g or less, wherein the molar ratio of the compound to vinyl alcohol units of the ethylene-vinyl alcohol copolymer is $2.96 \times 10^{-9}$ or greater and $2.64 \times 10^{-5}$ or less, wherein an ethylene content of the ethylene-vinyl alcohol copolymer (A) is 20 mol % or greater and 60 mol % or less.

2. The ethylene-vinyl alcohol copolymer resin composition according to claim 1, wherein a ratio $\epsilon 2/\epsilon 1$ that is a ratio of an extinction coefficient $\epsilon 2$ at 225 nm after a heat treatment in an air at 120° C. for 24 hrs to an extinction coefficient $\epsilon 1$ at 225 nm before the heat treatment is 2.0 or less.

3. The ethylene-vinyl alcohol copolymer resin composition according to claim 1, wherein the compound (B) is gallic acid, methyl gallate, ethyl gallate, propyl gallate, isoamyl gallate, or a combination thereof.

4. The ethylene-vinyl alcohol copolymer resin composition according to claim 1, wherein the compound (B) is pyrogallol, catechol, or a combination thereof.

5. The ethylene-vinyl alcohol copolymer resin composition according to claim 1, wherein the compound (B) is epicatechin, epigallocatechin, epigallocatechin gallate, or a combination thereof.

6. The ethylene-vinyl alcohol copolymer resin composition according to claim 1, wherein the compound (B) is tannic acid.

7. The ethylene-vinyl alcohol copolymer resin composition according to claim 1, wherein the ethylene-vinyl alcohol copolymer (A) has a degree of saponification of 95 mol % or more.

8. The ethylene-vinyl alcohol copolymer resin composition according to claim 1, further comprising:

a phosphoric acid compound, which is phosphoric acid, in an amount of 0 ppm or greater and 510 ppm or less in terms of phosphate radical equivalent; and a boron compound, which is boric acid, in an amount of 0 ppm or greater and 996 ppm or less in terms of boron element equivalent, wherein an ethylene content of the ethylene-vinyl alcohol copolymer (A) is 24 mol % or greater and 55 mol % or less.

9. A method for producing the ethylene-vinyl alcohol copolymer resin composition according to claim 1, the method comprising:

saponifying an ethylene-vinyl ester copolymer to obtain the ethylene-vinyl alcohol copolymer (A), wherein an ethylene content of the ethylene-vinyl alcohol copolymer (A) is 20 mol % or greater and 60 mol % or less; and mixing the ethylene-vinyl alcohol copolymer (A) after the saponification with:

the compound (B), which is gallic acid, methyl gallate, ethyl gallate, propyl gallate, isoamyl gallate, tannic acid, pyrogallol, catechol, epicatechin, epigallocatechin, epigallocatechin gallate, ellagic acid, a salt thereof, or a combination thereof;

the monocarboxylic acid or a salt thereof, which is acetic acid, lactic acid, capric acid, or a salt thereof;

the multivalent carboxylic acid or a salt thereof, which is tartaric acid, aspartic acid, succinic acid, ethylenediamine tetraacetic acid, or a salt thereof;

the alkali metal ion, which is a sodium ion or a potassium ion; and the alkaline earth metal ion, which is a calcium ion or a magnesium ion, to obtain the ethylene-vinyl alcohol copolymer resin composition, wherein the molar ratio of the compound to vinyl alcohol units of the ethylene-vinyl alcohol copolymer is $2.96 \times 10^{-9}$ or greater and $2.64 \times 10^{-5}$ or less, wherein the monocarboxylic acid or a salt thereof is in an amount of 0 μmol/g or greater and 12.0 μmol/g or less in terms of carboxylic acid radical equivalent, wherein the multivalent carboxylic acid or a salt thereof is in an amount of 0 μmol/g or greater and 8.0 μmol/g or less in terms of carboxylic acid radical equivalent, wherein the alkali metal ion is in an amount of 0 μmol/g or greater and 21.0 μmol/g or less, wherein the alkaline earth metal ion is in an amount of 0 μmol/g or greater and 8.50 μmol/g or less, and wherein a total amount of metal ions is 22.0 μmol/g or less.

10. The method according to claim 9, further comprising:

pelletizing the ethylene-vinyl alcohol copolymer (A) obtained in the saponification by a granulating operation to obtain hydrous pellets comprising the ethylene-vinyl alcohol copolymer (A) and drying the hydrous pellets, wherein the mixing comprises immersing the hydrous pellets in a solution comprising the compound (B), the monocarboxylic acid or a salt thereof, the multivalent carboxylic acid or a salt thereof, the alkali metal ion, and the alkaline earth metal ion, and wherein the mixing is carried out after the pelletizing and before the drying.

11. The method according to claim 9, further comprising:

pelletizing the ethylene-vinyl alcohol copolymer (A) obtained in the saponification and the compound (B) by a granulating operation to obtain hydrous pellets comprising the ethylene-vinyl alcohol copolymer (A) and the compound (B); and drying the hydrous pellets.

12. A molded product formed from the ethylene-vinyl alcohol copolymer resin composition according to claim 1.

13. A multilayer structure, comprising a layer formed from the ethylene-vinyl alcohol copolymer resin composition according to claim 1.

* * * * *